United States Patent [19]

Nakano

[11] Patent Number: 5,506,696
[45] Date of Patent: Apr. 9, 1996

[54] COLOR IMAGE REPRODUCTION SYSTEM HAVING COLOR ANALYSIS FUNCTION PERFORMED WITH A NEURAL NETWORK SYSTEM

[75] Inventor: Yoshiki Nakano, Tokyo, Japan

[73] Assignee: Toyo Ink Manufacturing Co., Ltd., Tokyo, Japan

[21] Appl. No.: 288,494

[22] Filed: Aug. 10, 1994

[51] Int. Cl.$^6$ ............................. H04N 1/56; H04N 1/60
[52] U.S. Cl. .................. 358/504; 358/515; 358/518; 358/523; 382/156; 382/167
[58] Field of Search ...................... 358/504, 518, 358/519, 520, 523, 515; 382/167, 162, 156; 395/21

[56] References Cited

U.S. PATENT DOCUMENTS 4,929,978   5/1990   Kanamori et al. .................. 358/518
5,162,899  11/1992   Naka et al. ........................ 358/518
5,313,291   5/1994   Appel et al. ....................... 358/504

*Primary Examiner*—Scott A. Rogers
*Attorney, Agent, or Firm*—Ladas & Parry

[57] ABSTRACT

A color separation section for converting colorimetric values into color separation values adopts a neural network. When a color image output device for outputting a color image on the basis of color separation value signals is used, the color image output device to be used outputs a standard color sample having known color separation values. The color sample is colorimetrically measured by a colorimetry device to obtain colorimetric values of the color sample. The neural network executes learning to have conversion characteristics for converting the colorimetric values into corresponding color separation values. An object to be reproduced which has a required color is colorimetrically measured by the colorimetry device. Colorimetric values obtained by the colorimetry processing are converted into color separation values using the neural network of the color separation section. The color image output device outputs a target color based on the converted color separation values.

21 Claims, 14 Drawing Sheets

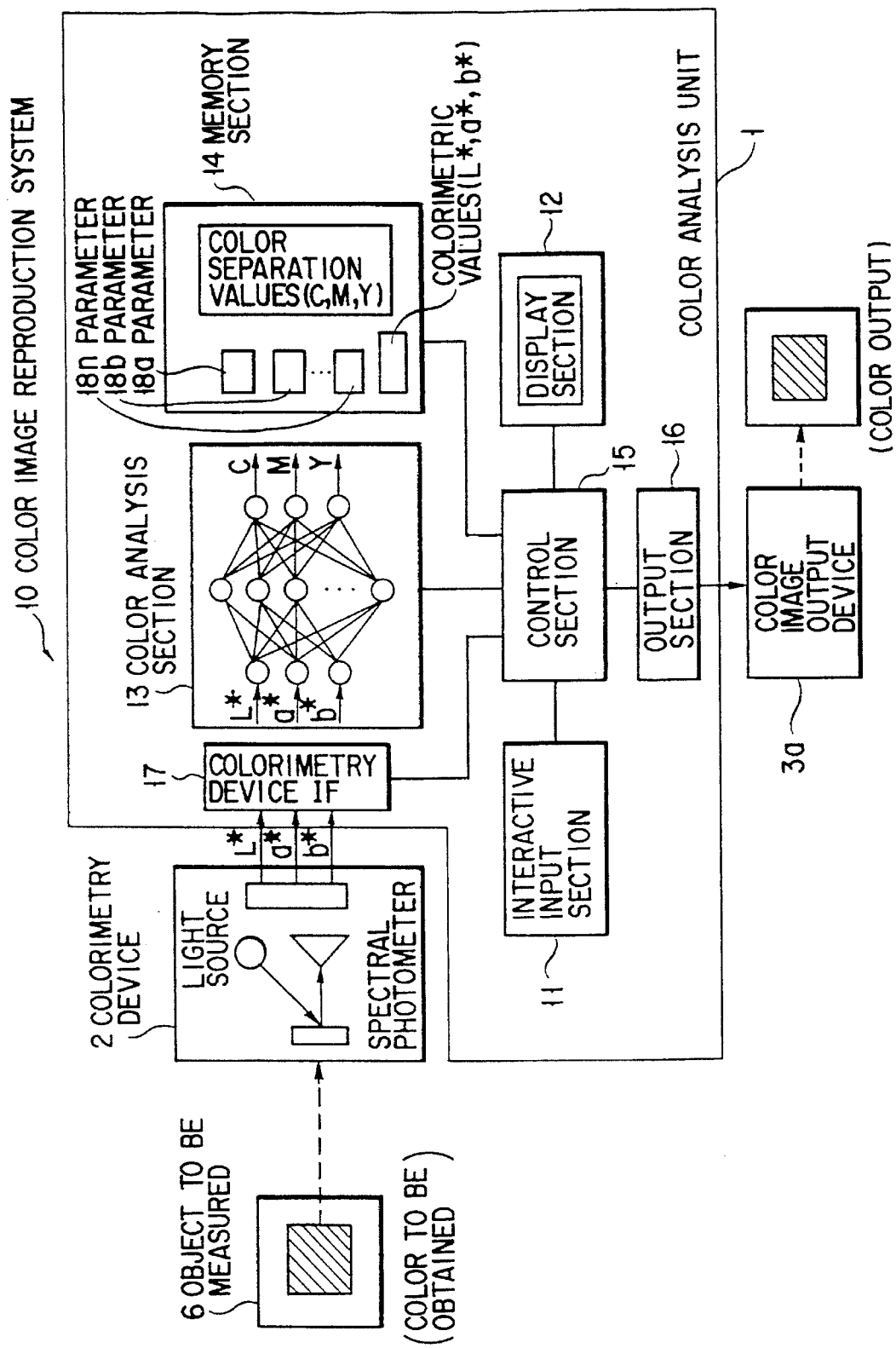
F I G. 4

| COLOR IMAGE OUTPUT DEVICE ||||||
|---|---|---|---|---|---|
| COLOR SEPARATION ||| COLORIMETRIC VALUE |||
| C (%) | M (%) | Y (%) | L* | a* | b* |
| 0 | 0 | 0 | $L_0$ | $a_0$ | $b_0$ |
| 0 | 0 | 25 | $L_1$ | $a_1$ | $b_1$ |
| ⋮ | ⋮ | ⋮ | ⋮ | ⋮ | ⋮ |
| 100 | 100 | 100 | $L_{125}$ | $a_{125}$ | $b_{125}$ |
F I G. 7
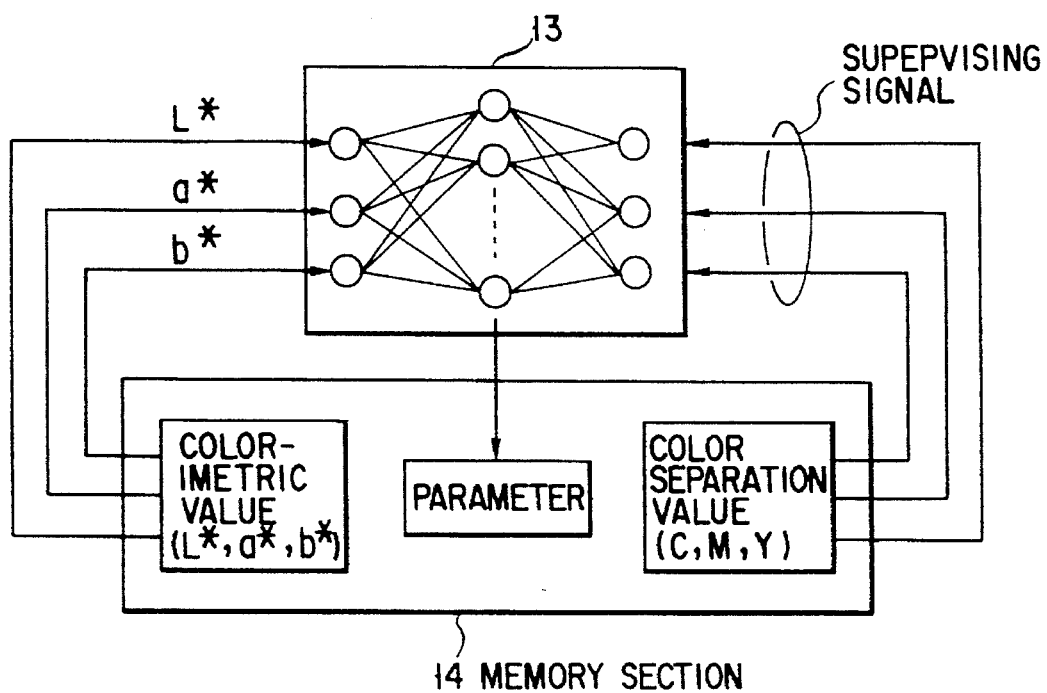
F I G. 8

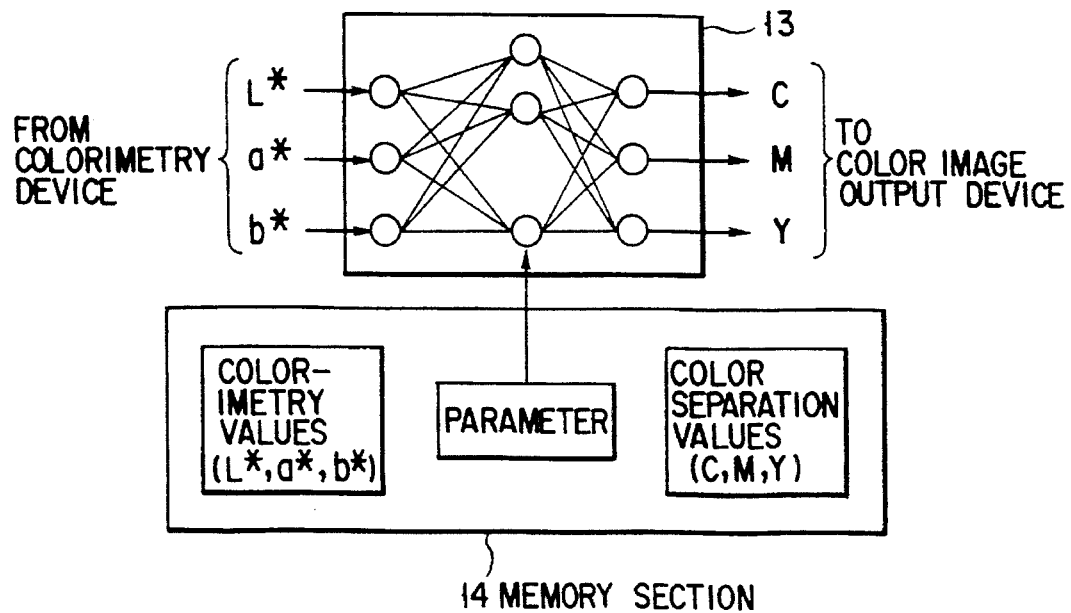
F I G. 9
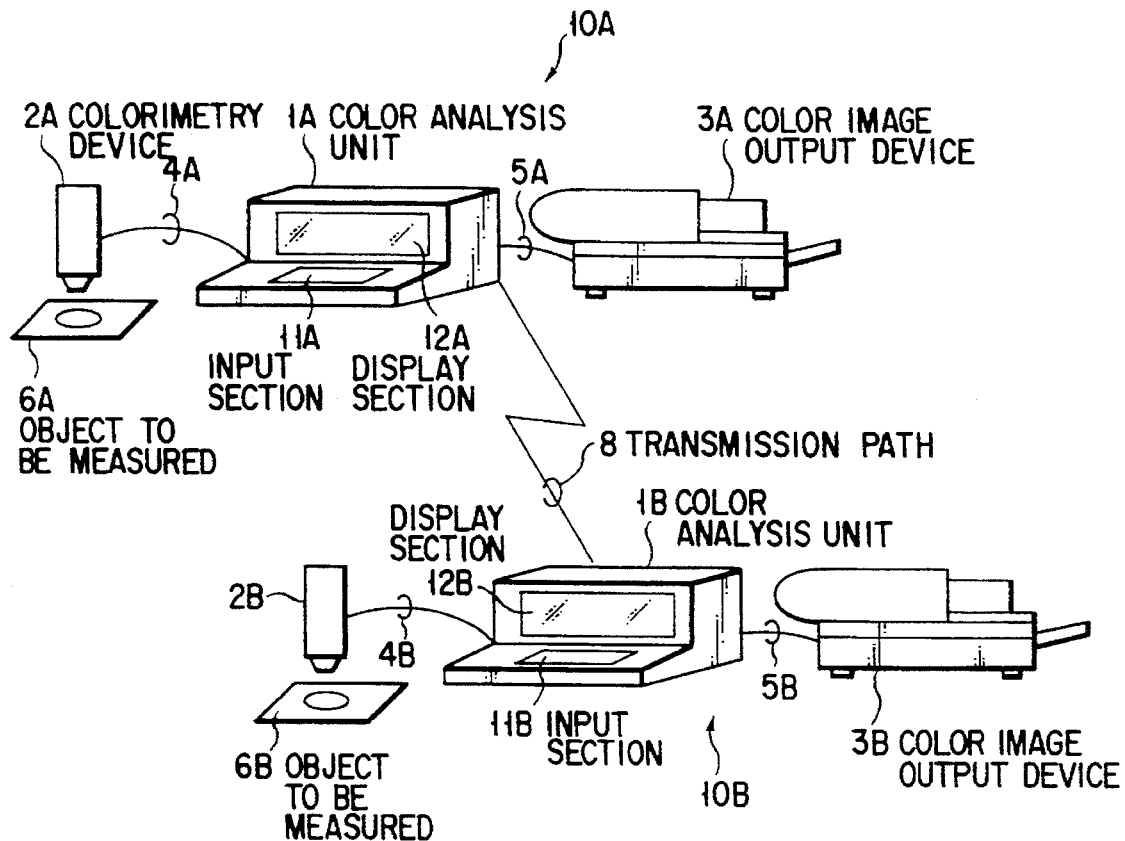
F I G. 10

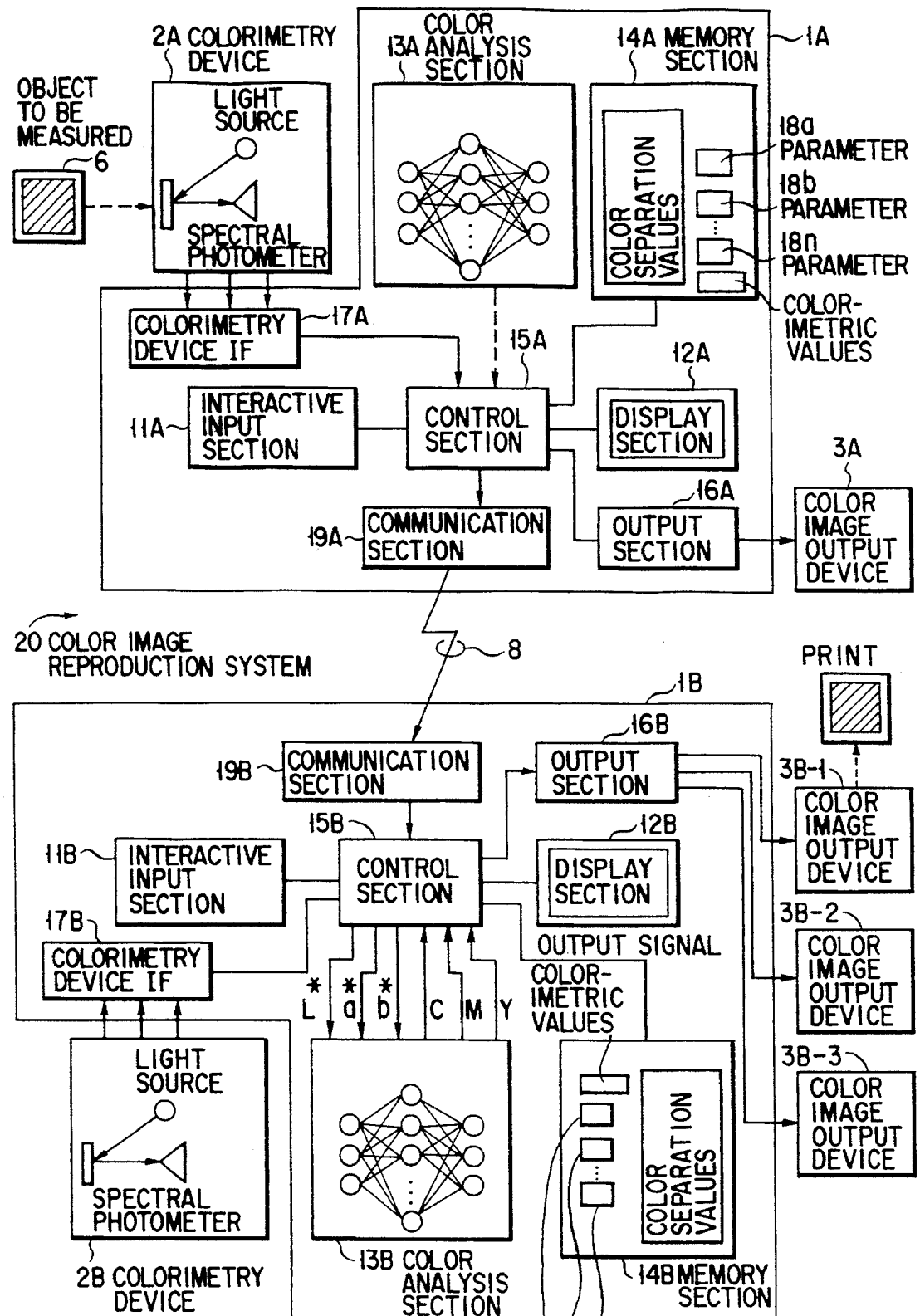
F I G. 11

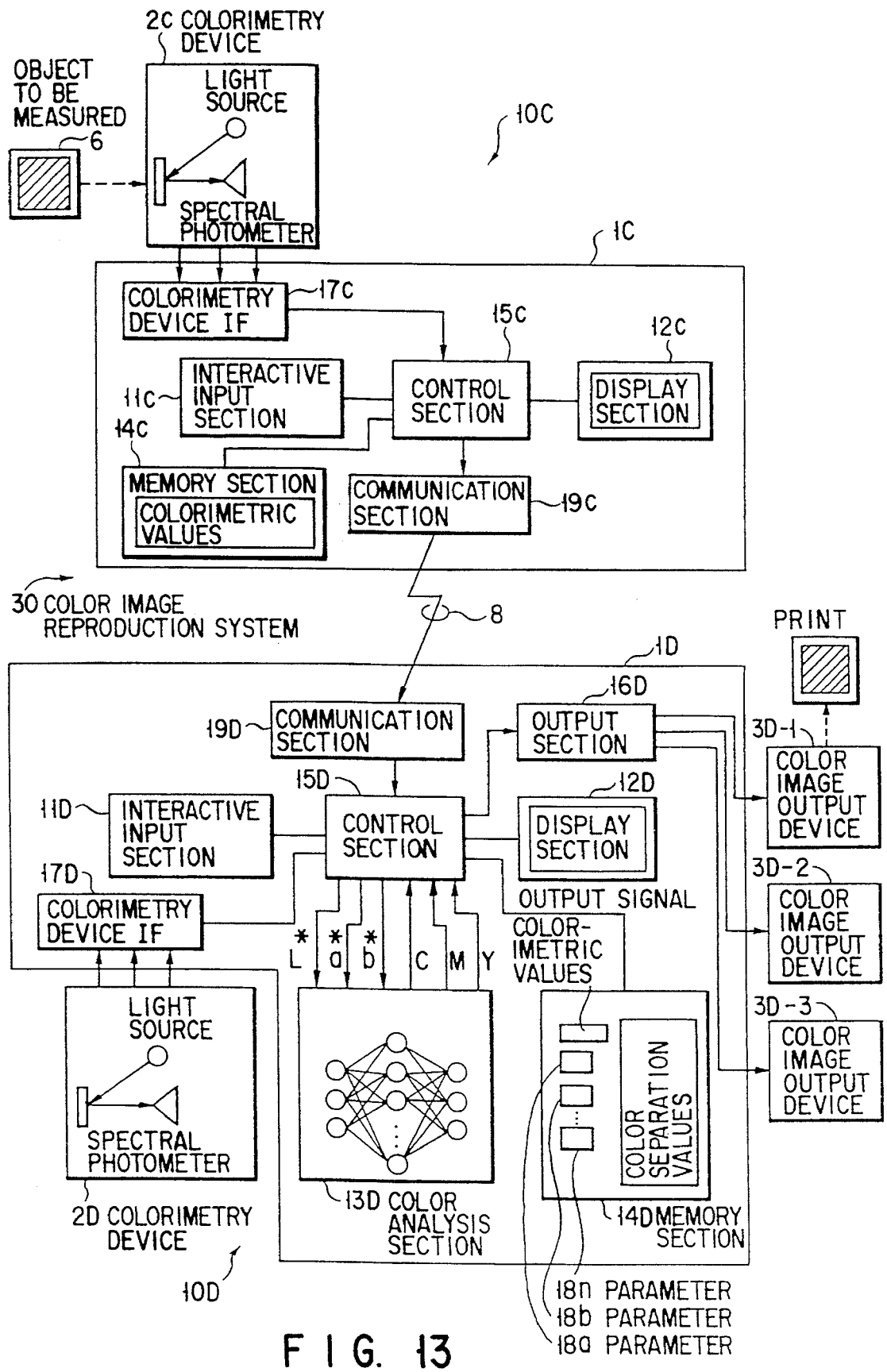
F I G. 13

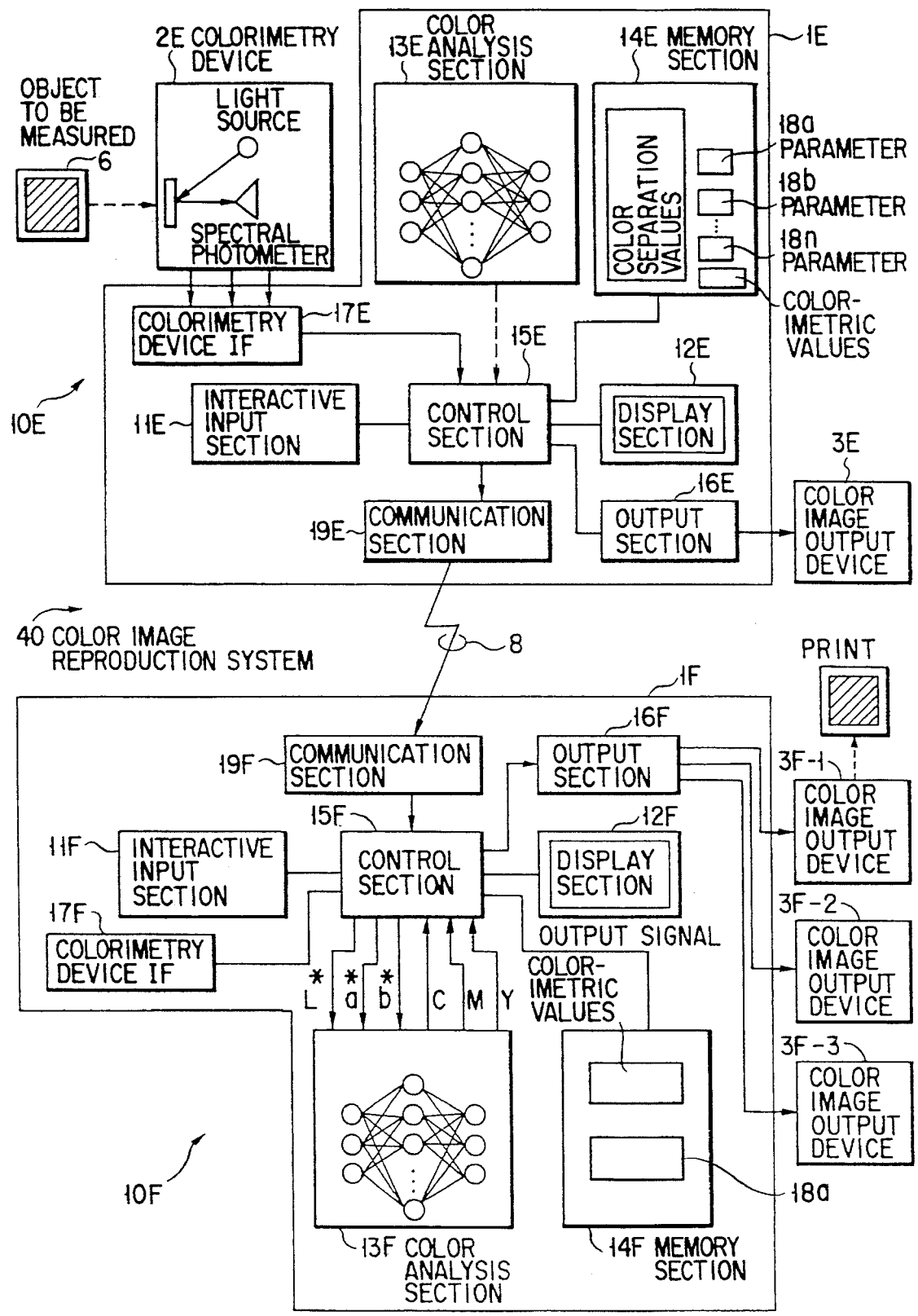
F I G. 14

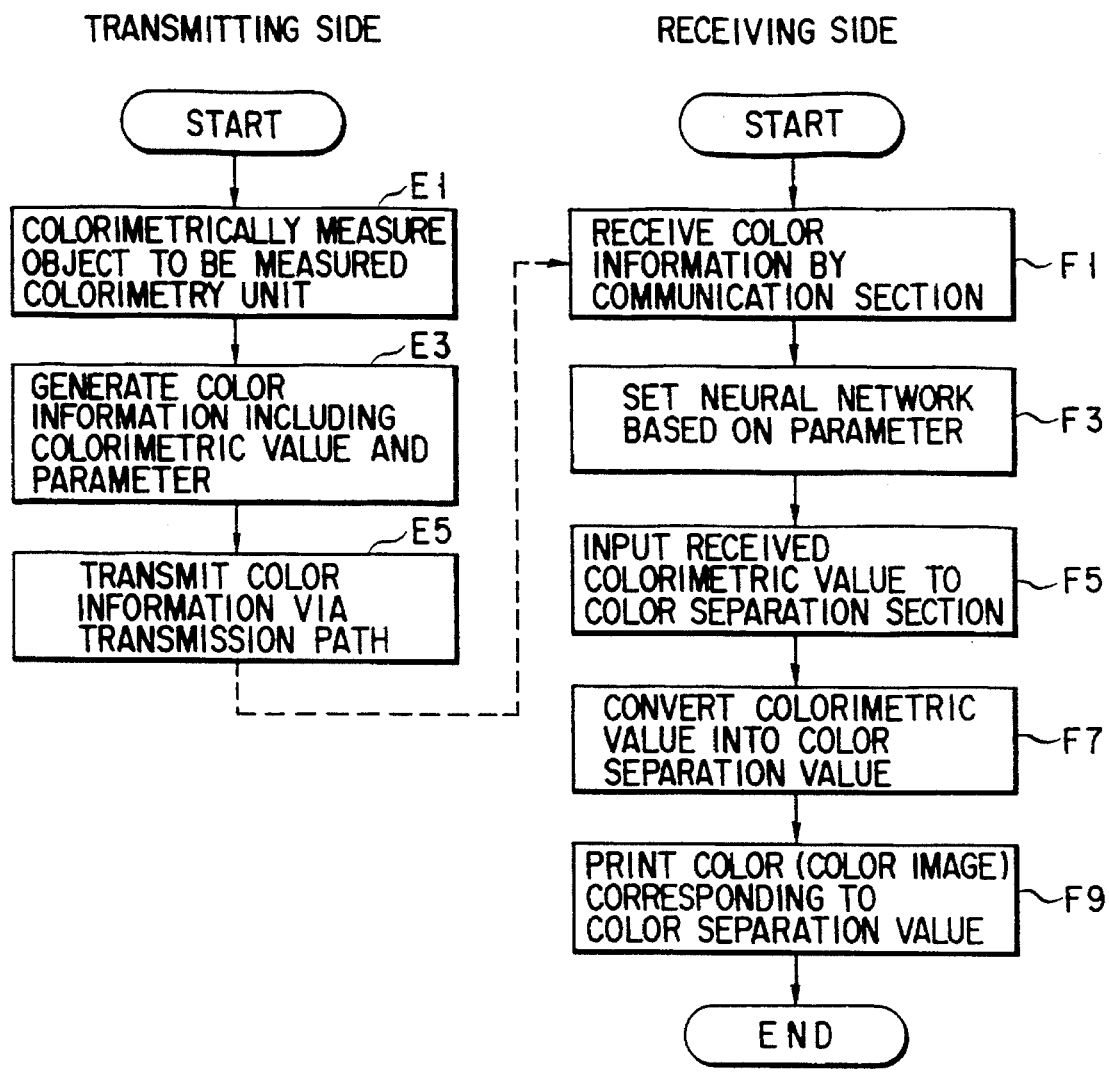
F I G. 15

COLOR IMAGE REPRODUCTION SYSTEM HAVING COLOR ANALYSIS FUNCTION PERFORMED WITH A NEURAL NETWORK SYSTEM

BACKGROUND OF THE INVENTION

1. Field of the Invention

The present invention relates to a color image reproduction system for reproducing a target color image (colors) using an image output device such as a color printer, a color copying machine, a color facsimile device, a color monitor, or the like and, more particularly, to a color image reproduction system having a color analysis function which allows conversion processing reflecting the characteristics of an image output device.

Also, the present invention relates to a color image reproduction system having a data transmission function which can accurately reproduce a color image in consideration of the characteristics of a color image output device even when a location where the colors of a target color image (colors) are colorimetrically measured is distant from the location of the image output device.

2. Description of the Related Art

In recent years, the uses of color image output devices such as a color printer, a color copying machine, a color facsimile device, a liquid crystal color display, a color CRT display, a projection type color display, and the like have been widespread.

Normally, the above-mentioned color image output devices represent various colors using three primary colors. When colors are to be artificially represented, different colors are assigned to a plurality of sub-area regions which are independent of each other or partially overlap each other in a very small area for representing a single color. A target color is recognized by a mixing of these colors in the visual sense of man.

This technique includes the subtractive color mixing process and the additive color mixing process. For example, in the subtractive color mixing process, three primary colors, i.e., C (cyan), M (magenta), and Y (yellow), and K (black) are used, whereas in the additive color mixing process, three primary colors, i.e., R (red), G (green), and B (blue) are used. In correspondence with the ratios of these primary colors, a color recognizable by man is determined. In this manner, a color is represented using ratios of the primary colors, and values corresponding to the ratios of the primary colors will be referred to as color separation values hereinafter. A color image signal used in the color image output device normally represents the above-mentioned CMY- or RGB-based color separation values, and such a color image signal will be referred to as a color separation value signal hereinafter.

As one problem related to color separation value signals, the above-mentioned values corresponding to the ratios of the primary colors are values which vary depending on the characteristics of each specific image output device, i.e., device-dependent values. The characteristics of the image output device are features defined by the image output method, the print material to be used, and the like. Therefore, the fact, that the device-dependent color separation value signals are device dependent, means that output color tones vary depending on factors such as the type of color image output device to be used, the color output method, the print materials (pigments, dyes, and the like) to be used in a print operation even when an identical color image signal is input. If different output devices are caused to output the same color, the color separation values must be changed in correspondence with the characteristics of the respective output devices. Therefore, in order to reproduce the same color, color separation value signals for overlapping dots such as CMY(K) signals, RGB signals, and the like must be generated in correspondence with the output devices involved.

For example, with the development of personal computers, design can be made with the use of a personal computer, and a color printer, or the like can be used as an output device. Furthermore, as a design step, coloring or creation of color samples is often performed. The fact that a target color cannot always be accurately output is a considerable obstacle to a designer.

On the other hand, as a device for quantitatively analyzing a color, a colorimetric device is known. According to this colorimetric device, when the colors of an input color sample are measured, colorimetric values such as CIE L*a*b* values, XYZ values, and the like of the color sample can be obtained. Color systems of the colorimetric values such as the CIE L*a*b* (to be referred to as L*a*b* hereinafter) values, XYZ values, and the like of display colors by numerical values, and are represented in the form of sets of three numerical values.

The L*a*b* color system is one recommended by the CIE (Commission Internationale de l'Eclairage) in 1976, and is a uniform color space which is defined so that a predetermined distance between two colors displayed on this coordinate system corresponds to a predetermined perceptive color difference in any color region. An L* value represents the degree of lightness of a color, and a combination of a* and b* values represent the relationship between the hue and saturation of a color.

The XYZ color system is one associated with data of a standard observer adopted by the CIE in 1931, and is defined by tristimulus values calculated using color matching functions $x(\lambda)$, $y(\lambda)$, and $z(\lambda)$. Values (colorimetric values) defined in these spaces are the values of colors themselves which are independent of the characteristics of input/output devices, i.e., device-independent values.

In this manner, the colorimetric values represent, as numerical values, the lightness, hue, and saturation; in the L*a*b* colorimetric system, L represents the lightness, a represents the hue, and b represents the saturation; and in the XYZ colorimetric system, x and y represent the chromaticity (hue and saturation), and Y represents the lightness. These numerical values are indices for objectively and quantitatively representing colors. The same colorimetric values express the same colors independently of the color materials, the output method, and the like.

However, signals of the colorimetric values defined by the L*a*b* or XYZ color system cannot be directly used in an image output device such as a color printer. For this reason, it is very difficult to cause a color image output device to be used to output a color to be represented.

A color image output device such as a color printer, a copying machine, a color facsimile device, or the like is often used as a plain color proof machine in the field of process printing. In these busy times, it is often difficult to assure a staff meeting time, and a design center is often distant from a print factory. For this reason, a designer may want to send a design sample to staffs, or to give a color instruction to a distant party.

In order to meet such demand, a conventional transmission technique may be used, and transmitted data may be output by a color image output device. However, as described above, since the color separation values which are transmitted by the conventional transmission technique are values depending on the characteristics of an output device, desired colors cannot always be properly reproduced.

SUMMARY OF THE INVENTION

It is the first object of the present invention to provide a color image reproduction system which obtains, by analysis, values, corresponding to color separation values (CMY or RGB values) representing a color to be reproduced, in an image output device to be used, and which can accurately reproduce the color to be reproduced using the image output device to be used.

It is the second object of the present invention to provide a color reproduction system which can accurately reproduce a color to be reproduced using an image output device distant from a location where colorimetry is to be performed.

In order to achieve the above and other objects, according to a first aspect of the present invention, there is provided a color image reproduction system which comprises colorimetry means for generating a colorimetric value signal by colorimetrically measuring a color sample, and image output means capable of outputting a color image corresponding to a color separation value signal and capable of outputting a standard color sample in correspondence with predetermined color separation value signals, which comprises: conversion means, constituted by a neural network, for converting the colorimetric value signal generated by the colorimetry means into a color separation value signal in accordance with the setting of a parameter; learning control means for controlling the neural network to learn from the conversion means so that colorimetric value signals of the standard color sample colorimetrically generated by the colorimetry means are converted into color separation value signals; and image reproduction control means for converting a colorimetric value signal of an object to be reproduced, which signal is generated by the colorimetry means, into a color separation value signal using the conversion means, and supplying the converted color separation value signal to the image output means to output a color image of the object to be reproduced.

According to a second aspect of the present invention, a color image reproduction system comprises: colorimetry means for generating a colorimetric value signal by colorimetrically measuring a color sample; a plurality of image output means of different types, each being capable of outputting a color image corresponding to a color separation value signal and of outputting a standard color sample in correspondence with predetermined color separation value signals; conversion means, constituted by a neural network, for converting the colorimetric value signal generated by the colorimetry means into a color separation value signal in accordance with the setting of a parameter; storage means for storing the parameter and the predetermined color separation value signals; input means for inputting an instruction of the image output means to be used in the color image reproduction processing of the plurality of image output means; and a processor for controlling the color image reproduction system. The processor is capable of executing processing for performing, for each of the plurality of image output means, a teaching of the neural network of the conversion means so as to convert the colorimetric value signals of the standard color sample which are colorimetrically measured by the colorimetry means into color separation value signals stored in the storage means. The processor is also capable of image reproduction and of reading out the parameter corresponding to the image output means designated by the input means from the storage means, setting the readout parameter in the conversion means, inputting a colorimetric value signal of an object to be reproduced, which signal is generated by the colorimetry means, to the conversion means, and outputting a color separation value signal converted by the conversion means to the image output means designated by the input means to output a color image corresponding to the colorimetric value signal of the object to be reproduced.

According to a third aspect of the present invention, a color image reproduction system comprises: a transmission path for connecting a plurality of units. A first of these units comprises first colorimetry means for generating a colorimetric value signal by colorimetrically measuring a color sample, and transmission means for transmitting the colorimetric value signal generated by the first colorimetry means via the transmission path. A second of these units comprises second colorimetry means for generating a colorimetric value signal by colorimetrically measuring a color sample, image output means adapted for outputting a color image corresponding to a color separation value signal and adapted for outputting a standard color sample in correspondence with predetermined color separation value signals, first conversion means, constituted by a neural network, for converting the colorimetric value signals generated by the first and second colorimetry means into color separation value signals in accordance with setting of a parameter, and storage means for storing the parameter and data represented by the predetermined color separation value signals. The second unit also comprises learning control means for generating the parameter and storing the generated parameter in the storage means by effecting a teaching of the neural network of the first conversion means, so that colorimetric value signals of the standard color sample, which signals are generated by the second colorimetry means, are converted into the color separation value signals of the data stored in the storage means, and output means for setting the parameter in the conversion means, converting a colorimetric value signal of an object to be reproduced. This signal is sent from the first unit via the transmission path, into a color separation value signal using the conversion means, and supplying the converted color separation value signal to the image output means to output a color image corresponding to the colorimetric value signal of the object to be reproduced.

According to a fourth aspect of the present invention, a color image reproduction system comprises: a transmission path for connecting a plurality of units. A first of these units comprises colorimetry means for generating a colorimetric value signal by colorimetrically measuring a color sample, first image output means for outputting a color image corresponding to a color separation value signal and for outputting a standard color sample in correspondence with predetermined color separation value signals, first conversion means, constituted by a neural network, for converting the colorimetric value signal generated by the colorimetry means into a color separation value signal in accordance with the setting of a parameter, and storage means for storing the parameter and data represented by the predetermined color separation value signals. The first unit also includes learning control means for generating the parameter and storing the generated parameter in the storage means by effecting teaching of the neural network of the first conversion means, so that colorimetric value signals of the standard color sample, which signals are generated by the colorimetry means, are converted into the color separation value signals of the data stored in the storage means. Further included is transmission means for generating color information on the basis of a colorimetric value signal of an object to be reproduced, which signal is generated by the colorimetry means, and the parameter stored in the storage means, and transmitting the color information onto the transmission path. A second of the unit comprises second image output means which outputs a color image in correspondence with a color separation value signal and is of the same type as the first image output means, second conversion means, constituted by a neural network, for converting a colorimetric value signal into a color separation value signal in accordance with the setting of a parameter, and output means for setting the parameter included in the color information sent from the first unit in the second conversion means, converting a colorimetric value signal of an object to be reproduced, which signal is included in the color information, into a color separation value signal using the second conversion means, and supplying the converted color separation value signal to the second image output means to output a color image corresponding to the colorimetric value signal of the object to be reproduced.

In each of the arrangements according to the first and second aspects, the neural network is applied to the conversion means for converting colorimetric values into color separation values. When the color image output means for receiving the color separation value signals and outputting a color image is to be used, the color image output means to be used outputs a reference color sample (standard color sample) having known color separation values. The color sample is colorimetrically measured to obtain colorimetric values of the color sample. The neural network of the convention means learns the measured colorimetric values to obtain color separation values corresponding to the color sample. With this learning, conversion characteristics (parameters) corresponding to the image output means are obtained. Thereafter, an object to be measured, which has desired colors, is colorimetrically measured, and colorimetric values obtained by the colorimetric processing are converted into color separation values by the neural network of the conversion means.

The colorimetric values provide information which does not depend on the characteristics of individual image output means and is inherent to a color, and a color is determined in correspondence with the colorimetric values. On the other hand, the image output means is a device for outputting a color by receiving color separation values. In this case, even if the same color separation values are input, different colors are printed or displayed if color image output devices have different print/display methods or use different color materials. For this reason, the colorimetric values which have an unchangeable relationship with colors are utilized. A target color is colorimetrically measured to obtain colorimetric values, and the colorimetric values are converted into color separation values for the image output means using the neural network which has undergone learning for the image output means to be used. Therefore, regardless of the print/display method or color materials used by the image output means, a target color can be output.

The neural network is a neural circuit for executing digital arithmetic processing. For this reason, since color separation values as converted values of the neural network are obtained as digital data, the color separation values are obtained as numerical value data. Therefore, according to the present invention, the correspondence between a color to be obtained and color separation values (CMY(K) or RGB values) in a color image output device to be used can be detected, and a target color can be easily reproduced by a target color image output device.

According to the arrangement of each of the third and fourth aspects, in systems equipped in two distant places, colorimetric values are transmitted from a transmitting system, and a receiving system outputs a color corresponding to the colorimetric values using a color image output device. Upon conversion from the colorimetric values into color separation values, a neural network which has been subjected to learning for the image output means is used.

In the receiving system, a standard color sample output from the image output means and having known color separation values is colorimetrically measured by the colorimetry device, thereby optimizing parameters in the neural network. Therefore, color separation values are used when color information based on colorimetric values transmitted via the communication means is to be output using a designated color image output device, e.g., the dot area ratio can be accurately and easily calculated, thus achieving accurate color transmission.

Furthermore, when the transmitting system comprises a color image output device of the same type as that used in the receiving system, the neural network performs learning for the image output device in the transmitting system, and parameters obtained by learning are transmitted to the receiving system together with the colorimetric values. In the receiving system, the neural network learns according to the transmitted parameters. Thereafter, color separation values are obtained, and the color image output device outputs a target color. Therefore, in the receiving system connected via the communication means, even when learning by the neural network cannot be performed or has not been performed yet, a target color (color image) can be output.

Additional objects and advantages of the invention will be set forth in the description which follows, and in part will be obvious from the description, or may be 10 learned by practice of the invention. The objects and advantages of the invention may be realized and obtained by means of the instrumentalities and combinations claimed in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

In the Drawings

FIG. 4 is a block diagram showing the arrangement, in a colorimetry mode, of the color image reproduction system shown in FIG. 1;

FIG. 7 is a table showing an example of colorimetric values (L*a*b* values) and color separation values (CMY values) stored in a memory section shown in FIG. 2;

FIG. 8 is a diagram showing the relationship, in the learning mode, between a color separation section and the memory section shown in FIG. 2;

FIG. 9 is a diagram showing the relationship, in the colorimetry mode, between a color separation section and the memory section shown in FIG. 4;

FIG. 10 is a view showing the outer appearance of a color image reproduction system according to a second embodiment of the present invention;

FIG. 11 is a block diagram showing the arrangement of the overall color image reproduction system shown in FIG. 7;

FIG. 13 is a block diagram showing the arrangement of the overall color image reproduction system according to the third embodiment of the present invention;

FIG. 14 is a block diagram showing the arrangement of the overall color image reproduction system according to the fourth embodiment of the present invention;

FIG. 15 is a flow chart showing the operation, in a communication mode, of the color image reproduction system shown in FIG. 14;

DETAILED DESCRIPTION OF THE PREFERRED EMBODIMENTS

The first to fourth embodiments of the present invention will be described hereinafter with reference to the accompanying drawings.

Figure 1:
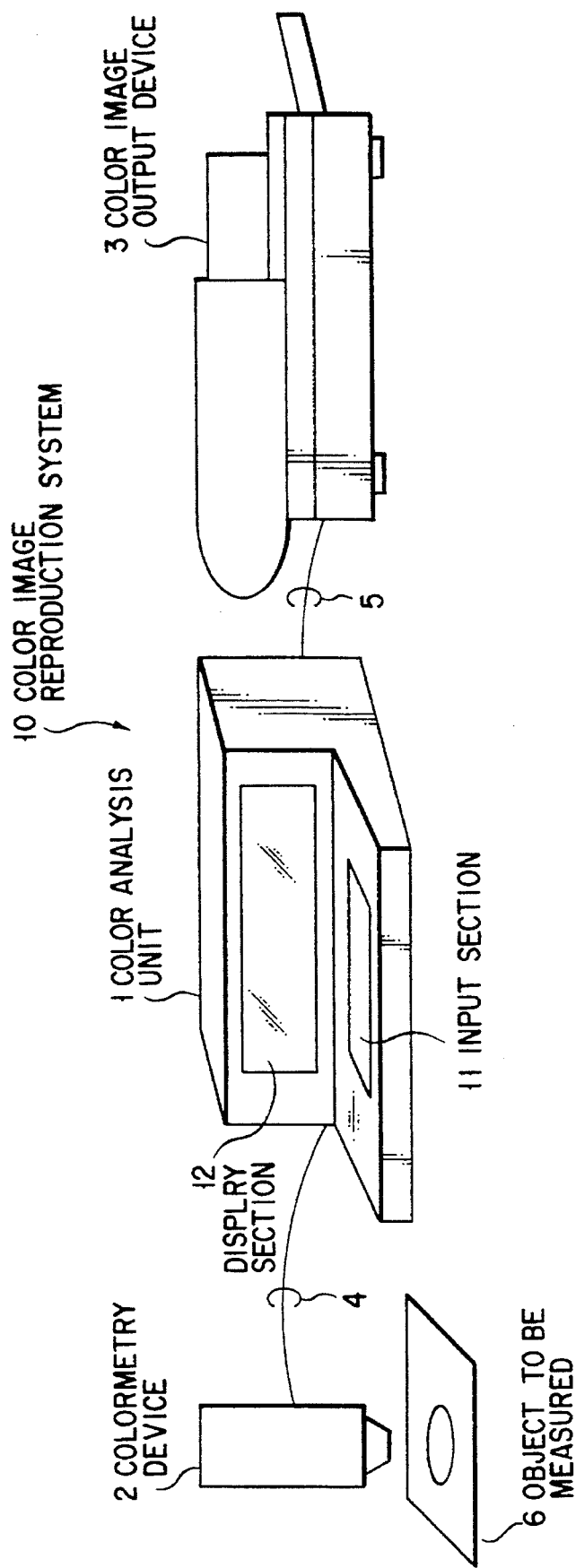
FIG. 1 is a view showing the outer appearance of a color image reproduction system according to a first embodiment of the present invention.

FIG. 1 shows the outer appearance of the first embodiment of a color image reproduction system according to the present invention. As shown in FIG. 1, a color image reproduction system 10 is constituted by a color analysis unit 1, a colorimetry device 2, and a color image output device 3. The color analysis unit 1 and the colorimetry device 2, and the color analysis unit 1 and the color image output device 3 are respectively connected via signal transmission lines 4 and 5. The color image reproduction system 10 has a learning mode for effecting teaching of a neural network (to be described later) and a colorimetry mode for colorimetrically measuring the color of an object to be reproduced, and reproducing the measured color. Each operation is executed in a pixel to reproduce a target color image.

The color analysis unit 1 receives colorimetric values output from the colorimetry device 2 via the transmission line 4, and calculates color separation values for expressing a target color in the color image output device 3 on the basis of the colorimetric values. The colorimetry device 2 optically reads an object 6 to be measured such as a design sheet, color sample, or the like, and outputs colorimetric values at the reading point as measured values. The colorimetry device 2 comprises, e.g., a spectral photometer, or the like.

The color separation values and the colorimetric values will be described below. As described above, the color separation values are values for expressing a target color using the ratios of the primary colors. The color separation values include a CMY(K) colorimetric system using C (cyan), M (magenta), and Y (yellow) (and K (black) in some cases) as the primary colors in the subtractive color mixing process, and an RGB colorimetric system using R (red), G (green), and B (blue) as the primary colors in the additive color mixing process, and color separation value signals work with either of these colorimetric systems. On the other hand, the colorimetric values are values defined in a uniform perceptual space such as the CIE L*a*b* space, XYZ space, or the like, and include an L*a*b* colorimetric system and an XYZ colorimetric system. Values defined by either of these colorimetric systems, i.e., CMY values, XYZ values, or the like are called colorimetric values. In this embodiment, the colorimetry device 2 outputs colorimetric values as a set of three numerical values obtained by calculating measured values using a predetermined arithmetic method as signals of the CIE L*a*b* colorimetric system (to be referred to as L*a*b* signals hereinafter in this embodiment).

The color analysis unit 1 comprises an interactive input section 11 and a display section 12 as man-machine interfaces. Note that the color analysis unit 1 shown in FIG. 1 can be connected to various types of image output devices. Also, a plurality of image output devices can be connected to the unit 1, as needed. The color image output device 3 is a color image output device such as a color printer, a color copying machine, a color facsimile device, or the like.

Figure 2:
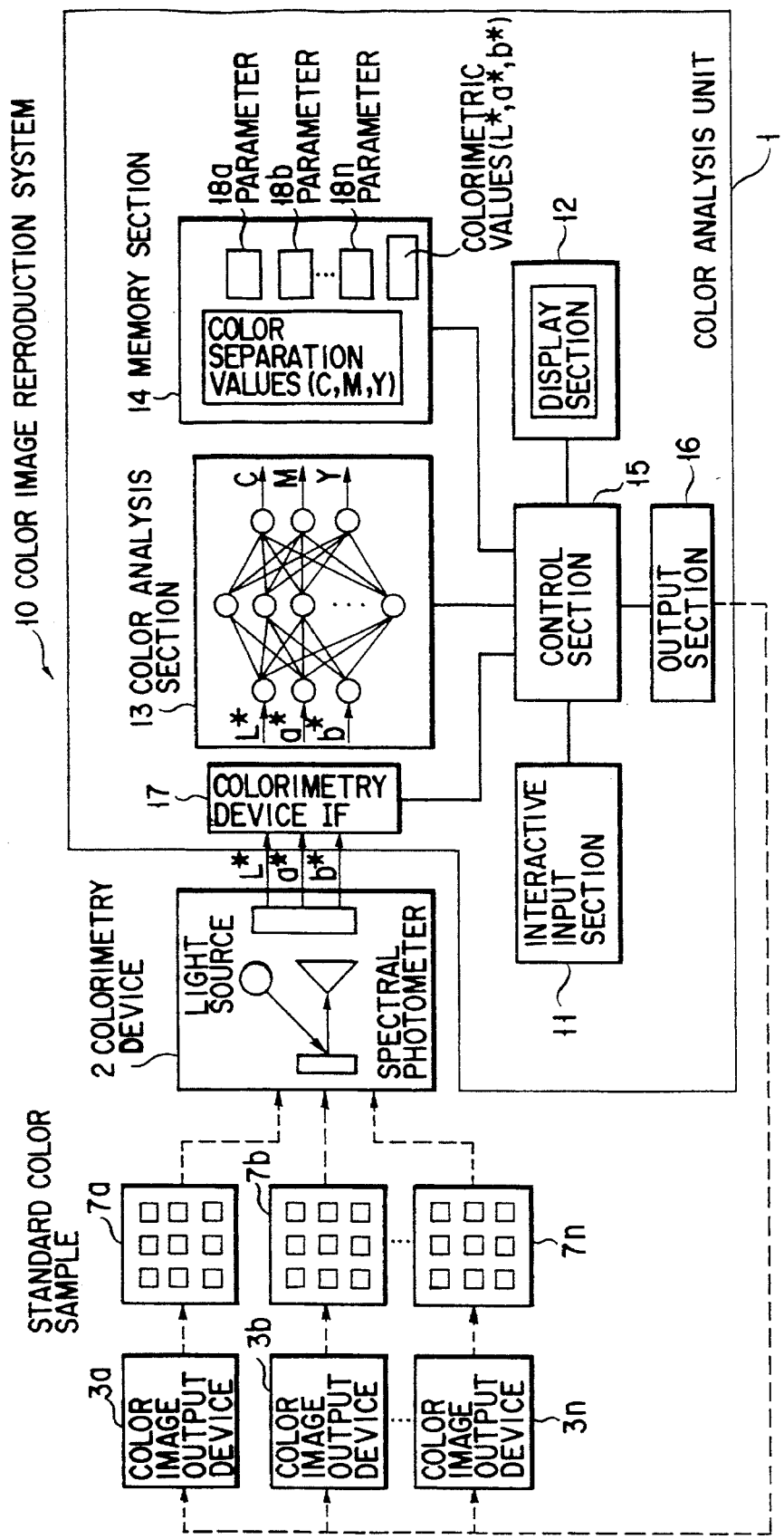
FIG. 2 is a block diagram showing the arrangement, in a learning mode, of the color image reproduction system shown in FIG. 1.

FIG. 2 shows the arrangement of the color analysis unit 1, and a state wherein the color image reproduction system 10 is used in the learning mode. As shown in FIG. 2, the color analysis unit 1 comprises the interactive input unit 11, the display section 12, a color separation section 13, a memory section 14, a control section 15, an output section 16, and a colorimetry device interface (IF) 17. The control section 15 controls these sections.

The interactive input section 11 comprises a manmachine interface such as a keyboard, a mouse, and the like. An operator can input commands, an instruction for a menu, and data, and can perform an edit operation, and the like.

The display section 12 can make various kinds of display operations under the control of the control section 15. For example, the display section 12 can display the type of a color image output device connected to the output section 16 of the color analysis unit 1, a correspondence table of colorimetric values and color separation values of the color image output device of this type, the learning mode or the colorimetry mode selected by an operator, and the like.

The color separation section 13 uses a neural network (neuro-computer). The neural network to be used is a feed-forward coupling multiple layers type neural network, and various methods are available as the learning method of this network. For example, the steepest descent method of the back propagation algorithm (see Runmelhart, D. E and McClelland, J. L. (Eds), "Parallel Distributed Processing", Exploration in the Microstructure of Cognition. Vol 1, 2, MIT Press Cambridge (1989), and the like, or Ochiai et al., *Toyohashi KaqakuGijits Daigaku*, and the like) can be employed.

In the colorimetry mode, the color separation section 13 receives L*a*b* signals sent from the colorimetry device 2, converts the L*a*b* signals into corresponding color separation value signals, e.g., CMY signals in the CMY(K) system, and outputs the converted signals. In the learning mode, the color separation section 13 fetches colorimetric value signals (L*a*b* signals) of prints 7a to 7n of standard color samples output from color image output devices 3a to 3n (n>0), and color separation value signals (CMY signals) of standard color samples corresponding to these color samples. Furthermore, the color separation section 13 learns the CMY signals of the standard color samples as training signals so that the CMY signals of the standard color samples are obtained from the input L.a.b. signals. In this embodiment, the neural network constituting the color separation section 13 includes three layers, an input layer and an output layer consist of three units respectively, and an intermediate layer consists of nine units. However, construction of the neural network is not limited to the above construction.

Figure 17:
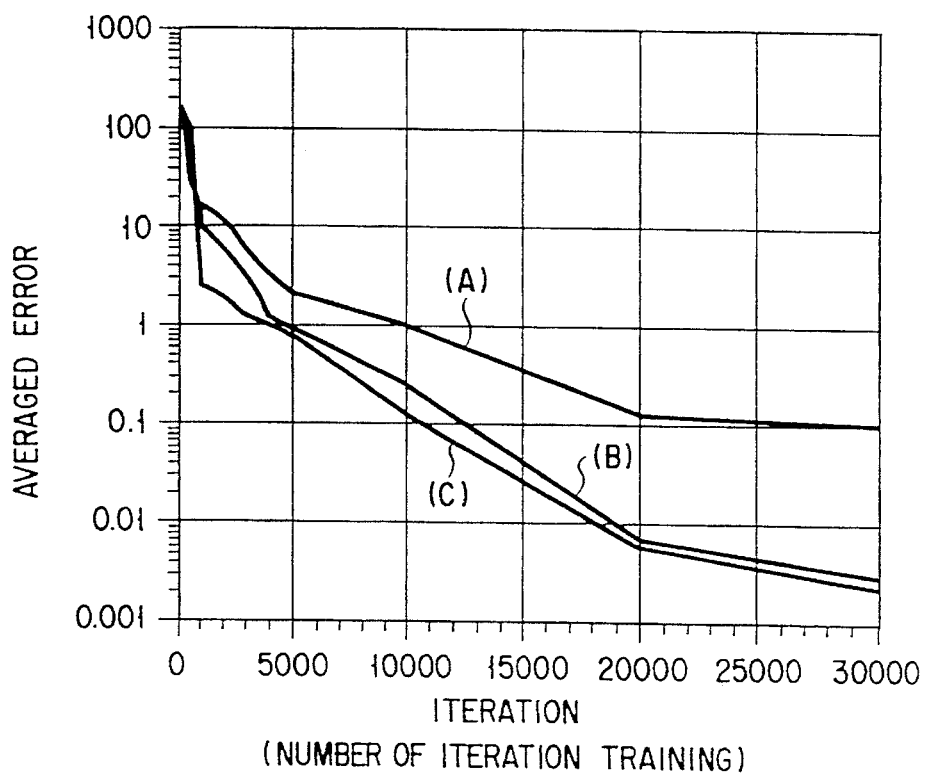
FIG. 17 is a graph showing a relationship, in a neural network, between an averaged error and an iteration training for the cases wherein an intermediate layer is constituted by five units, nine units and eleven units.

FIG. 17 shows a relationship of a neural network between an averaged error and iteration training. The neural network consists of three layers. An input layer and an output layer of the neural network include three units respectively. A line (A) indicates the relationship of the neural network including an intermediate layer consisting of five units. A line (B) indicates the relationship of the neural network including an intermediate layer consisting of nine units. A line (C) indicates the relationship of the neural network including an intermediate layer consisting of eleven units. As a difference in the averaged error between the line (A) and a line (B) is small, the neural network including the intermediate layer consisting of nine units is applied to this embodiment. A neural network including equal to or more than three layers or a neural network consisting of layers including equal to or more than three units respectively, may be applied to the present invention so as to reduce the averaged error.

Figure 16:
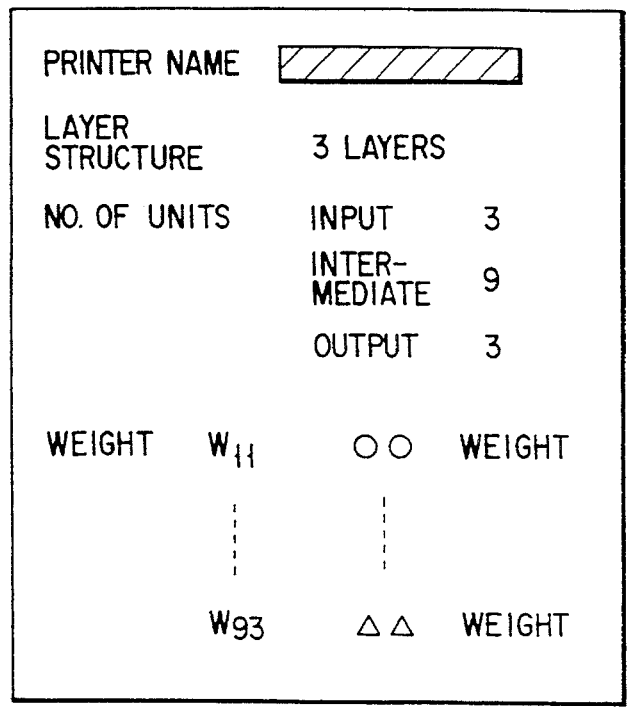
FIG. 16 is a view showing information in parameters stored in the memory section shown in FIG. 2.

The memory section 14 stores data indicating color separation values (CMY values) used as training signals in the neural network, data indicating colorimetric values (L*a*b* values) of a standard color sample colorimetrically measured by the colorimetry device 2 upon learning, and parameters 18a to 18n of the neural network which has finished learning. The parameters are read out in the colorimetry mode after the end of learning, and are used in processing of the neural network. The parameters are stored in units of color image output devices, and are used in correspondence with the color image output devices in accordance with an operator's instruction. FIG. 16 shows an example of various kinds of information included in the parameters. In this case, the parameters include the printer name, the layer structure of the neural network, the number of units of each of layers constituting the neural network, and the weight value determined by learning. The memory section 14 shown in FIG. 2 separately stores the color separation values and the colorimetric values. For example, as shown in FIG. 7, the memory section 14 may store the color separation values and the colorimetric values in association with each other in the form of tables in units of color image output devices 3a to 3n. In the table shown in FIG. 7, the color separation values C (cyan), M (magenta), and Y (yellow) each ranging from 0% to 100% are converted from 0% in units of 25%, standard color samples including respective blocks are output from the color image output device, and the color samples are colorimetrically measured by the colorimetry device 2.

The control section 15 controls transmission/reception of data and commands among the respective constituting elements of the color analysis unit 1, execution of arithmetic processing, and the like. The control section 15, e.g., a microprocessor, connects all the constituting elements in the color analysis unit 1 via a bus, and realizes various kinds of control and arithmetic processing in a software manner. The control section 15 outputs CMY signals converted by the color separation section 13 to the output terminal of the output section 16, and outputs the CMY signals to the color image output devices 3a to 3n connected to the output terminal. In the learning mode, the control section 15 stores the colorimetric values (L*a*b* values) of the prints 7a to 7n of the standard color sample, which values are colorimetrically measured by the colorimetry device 2, in the memory section 14, and reads out and utilizes these values upon learning by the neural network.

The output section 16 receives the color separation value signals (CMY signals) from the control section 15 and sends the received signals to the connected color image output devices 3a to 3n under the control of the control section 15. The output section 16 has at least one connector for connecting the color image output devices 3a to 3n when the plurality of color image output devices 3a to 3n are connected to the output section 16, output CMY signals are sent to only the color image output device as a target device upon generation of the CMY signals under the control of the control section 15.

The colorimetry device IF 17 receives colorimetric value signals (L*a*b* signals) sent from the colorimetry device 2 via the signal transmission line 4, and sends them to the control section 15.

As described above, the colorimetry device 2 of the color image reproduction system 10 colorimetrically measures the standard color samples 7a to 7n output from the color image output devices 3a to 3n in the learning mode, as shown in FIG. 2.

The color image output devices 3a to 3n are those capable of performing a color display, and are, e.g., color printers, and the like which receive a color image signal as color separation values and output a color image corresponding to the color separation values. The color image output devices 3a to 3n are connected to the output terminal provided to the output section 16 in the color analysis unit 1 when they are used.

The color image output devices 3a to 3n may be image display devices such as color video monitors in addition to devices for outputting hard copies. Each of the color image output devices 3a to 3n performs the function of outputting a predetermined standard color sample. The standard color sample is output from the image output device 3 on the basis of specific color separation values, e.g., CMY signals for outputting a specific color sample of the CMY(K) system.

The colorimetry device 2 reads the standard color sample output from the color image output device 3a (to 3n), and converts read values into colorimetric values, e.g., signals of the CIE L*a*b* colorimetric system. The colorimetry device 2 adopts the spectral photometer, as described above. The spectral photometer is a device for displaying a color as numerical values. The spectral photometer radiates light onto an object, measures the intensity of light reflected by or transmitted through the object by utilizing the photoelectric principle, displays colorimetric values as a set of three numerical values obtained by calculating the measured value as a predetermined arithmetic method, or spectrum reflectances. Basically, the colorimetry device 2 is constituted by a light source and the spectral photometer.

The operation in the learning mode of the first embodiment will be described below with reference to the flow chart in FIG. 3.

In the color image reproduction system 10, color separation values are generated using a standard color sample having known color separation values (CMY values in this embodiment), so that the output color of the color image output device 3 coincides with that of an object to be reproduced. In this case, the color separation section 13 must undergo a learning processing to obtain color separation values which can yield the same color as that of the object to be reproduced, in consideration of the color output characteristics of the color image output device 3 as an object to be used in the output operation. The learning processing is effected after the learning mode is designated at the input section 11. First, the color image output devices 3a to 3n to be used output the prints 7a to 7n of the standard color sample having known color separation values (CMY values). Each of the prints 7a to 7n of the standard color sample is a sheet of color sample on which a plurality of blocks each having a predetermined size are printed in different single colors and are displayed next to each other. In general, each of the color image output devices 3a to 3n is capable of outputting such a standard color sample in a specific mode such as a calibration mode of the device.

In order to use a device which does not have such a mode, the control section 15 may have an output function of a standard color sample, and when a standard color sample output command is input from the input section 11, data of the standard color sample may be output from the color image output devices 3a to 3n connected to the color analysis unit 1 (indicated by dashed lines from the output section 16 to the color image output devices 3a to 3n in FIG. 2).

As for colors (standard colors) of the blocks on the standard color sample, color separation values used for color-developing the color of each block are set in advance in the memory section 14, so that a designated standard color can be read out.

Upon execution of learning, an operator sets the color analysis unit 1 in the learning mode by operating the input section 11, and inputs a learning execution command.

The color image output device 3a (or one of the devices 3a to 3n) is connected to the output terminal of the color analysis unit 1, and the connected color image output device 3a (to 3n) is caused to output the print 7a (to 7n) of the standard color sample (step A1). The output standard color sample is colorimetrically measured using the colorimetry device 2 of the color analysis unit 1 (step A3). The colorimetry device 2 executes colorimetry processing for all the blocks by reading each of the standard color blocks of the standard color sample in turn. In this processing, each of the standard color blocks may be manually read, or a system for automatically scanning the standard color samples in units of sheets under the control of the control section 15 may be used. The colorimetric values (L*a*b values) of the standard color sample read by the colorimetry device 2 are temporarily stored in the memory section 14.

After the colorimetry processing of the color sample ends, the control section 15 of the color analysis unit 1 reads out the colorimetric values of one block on the standard color sample in accordance with the above-mentioned learning execution command, and inputs the readout values to the color separation section 13 as input signals (step A5). At the same time, the control section 15 reads out data of color separation values corresponding to this color sample from the memory section 14, and supplies the readout values to the color separation section 13 as training signals (step A7).

The control section 15 controls learning by the neural network using the data of the known color separation values of the standard color sample read out from the memory section 14 as training or teaching signals for the neural network of the color separation section ].3, and using data (L*a*b* signals) of the colorimetric values from the colorimetry device 2 as input signals, so that the outputs approach the training signals (step A9).

The training signal indicates information of a correct answer for the input, and learning means that the strength of coupling (i.e., weighting) in the network is changed, so that the output for the input coincides with the training signal. The learning is performed until the output satisfies a required standard for the training signal.

More specifically, the color separation section 13 receives the colorimetric values corresponding to the color sample as the inputs of the neural network, and changes the coupling strength in the neural network repetitively from, e.g., an initial condition, so that the outputs of the neural network for the inputs approach the values of the training signals. Such a processing operation is repeated a number of times, thereby effecting the learning by the neural network of the color separation section 13.

The control section 15 checks if the learning by the neural network is effected based on all the standard color blocks on the standard color sample, which is colorimetrically measured by the colorimetry device 2 (step A11). If the colorimetric values which are not input to the color separation unit 13 still remain (NO in step A11), processing in steps A5 to A9 is repeated for the colorimetric values. In step A5, the colorimetric values of the standard color sample are input to the color separation section 13 in a predetermined order, e.g., the reading order of the standard color blocks.

If the learning ends (YES in step A11), various parameters of the neural network at that time are stored in the memory section 14 (step A13). The parameters are weights for the corresponding input values in neurons of the color separation section 13.

In this manner, the learning for an arbitrary color image output device 3 ends. When another color image output device is to be used (NO in step A15), the color image output device is connected to the output terminal and the same operation as described above is performed so as to teach this color image output device (steps A1 to A13).

For example, if three color image output devices 3a to 3c are to be used (they have different output methods, print materials to be used, types, and the like), learning is performed for each of these three devices. The parameters 18a to 18c as the learning results of these three color image output devices 3a to 3c are stored in the memory section 14, so that they can be independently selected in correspondence with the output devices 3a to 3c. The parameters 18a to 18c can be designated and selected in the form of a menu using the input section 11 and the display section 12 under the control of the control section 15.

When the learning operations for all the color image output devices to be used end, the learning mode of the color image reproduction system 10 ends. Note that a switching operation to learning corresponding to the next color image output device 3 is performed in accordance with an instruction displayed on, e.g., the display section 12.

With the above-mentioned learning processing, the color separation section 13 determines the parameters of the neural network for calculating CMY values corresponding to the color image output device 3 to be used from input L*a*b* signals. FIG. 8 shows the relationship among the neural network of the color separation section 13, the colorimetric values and color separation values stored in the memory section 14, and the parameters in the learning processing. As shown in FIG. 8, the colorimetric value signals (L*a*b* signals) become the input signals of the neural network, and the color separation value signals (CMY signals) become the training signals.

Figure 5:
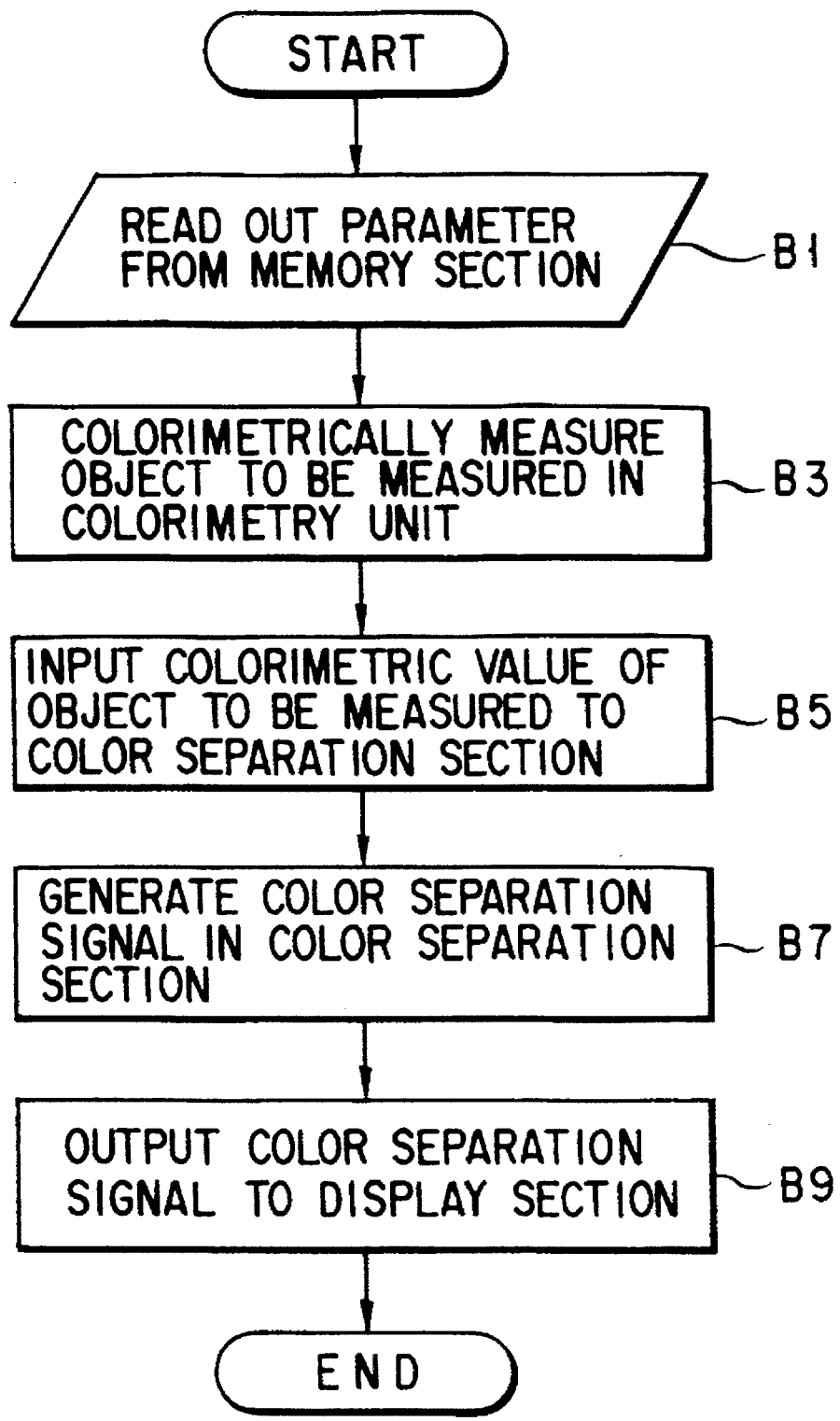
FIG. 5 is a flow chart for explaining the operation of the color image reproduction system shown in FIG. 4.

Upon completion of the learning processing of the neural network, an operator or designer can perform color analysis and printing of an image using the color image reproduction system 10. The operation in this colorimetry mode will be described below with reference to FIGS. 4 and 5.

The operator or designer connects one to be used of the learned color image output devices 3a to 3n to the output terminal of the color analysis unit 1. When the color image output device 3a is used, the operator or designer registers the use of the color image output device 3a at a predetermined position in the memory section 14 using the input section 11.

Upon this operation, the control section 15 executes various kinds of processing in the colorimetry mode. In the colorimetry mode, the control section 15 reads out the parameters 18a for the color image output device 3a from the memory section 14, and sets the readout parameters in the neural network of the color separation section 13 (step B1). Next, a design sheet is colorimetrically measured as an object 6 to be measured using the colorimetry device 2 (step B3). Thus, the colorimetry device 2 outputs colorimetric value signals, i.e., L*a*b* signals of a design sheet. The L*a*b* signals are supplied to the color separation section 13 via the colorimetry device IF 17 (step B5). The color separation section 13 converts the input L*a*b* signals into CMY signals corresponding to the color image output device 3a by the neural network which has already been set in accordance with the parameters 18a, and supplies the converted signals to the control section 15 (step B7).

The control section 15 causes the display section 12 to display CMY values indicated by the CMY signals, and sends the CMY signals to the color image output device 3a via the output section 16 (step B9). The color image output device 3a prints out a color corresponding to the colorimetric portion of the design sheet in accordance with the input CMY signals. The operator or designer can observe the output print and can confirm if the output color is a target color. Also, the operator or designer can numerically know CMY values required for displaying the color. FIG. 9 shows the relationship in the neural network of the color separation section 13, the colorimetric values and color separation values stored in the memory section 14, and the parameters in the above-mentioned colorimetry mode. As shown in FIG. 9, only the parameters stored in the memory section 14 are used for setting the neural network. The neural network receives L*a*b* signals output from the colorimetry device 2, and converts them into CMY signals.

In the above operation, any data indicated by the output colorimetric value signals (step B3) and any data indicated by the converted signals (step B7) can be saved temporarily in a frame memory (not shown in figures). The frame memory has an ability to save those data corresponding to a design sheet all over. The control section 15 sequentially read out data from the frame memory.

The L*a*b* values as colorimetric values output from the colorimetry device 2 are those for a portion to be measured on the design sheet, and the lightness, hue, and saturation as information inherent to a color are expressed by numerical values. These values do not depend on the characteristics of an input/output device, and are objective and absolute color display indices at which color prints from any output devices can be visually observed in the same color as long as the same L*a*b* values are used.

On the other hand, the CMY signals as color separation value signals reflect differences in output methods, color materials, and the like of image output devices, and as a result, even when the same CMY values are input, different colors are output if the different image output devices are used.

Thus, a standard color sample having known color separation values and output from an image output device to be used is used, and the standard color sample is colorimetrically measured to obtain colorimetric values (L*a*b* values in this embodiment) of the standard color sample. The neural network learns the colorimetric values using the corresponding color separation values (CMY values defined by the CMY(K) space in this embodiment) of the standard color sample as training signals. Using the neural network which has learned the relationship between the color separation values and an actual output color, processing for obtaining color separation values of the image output device to be used in correspondence with the colorimetric values of a color to be measured as an object to be reproduced is executed. Thus, a target color can be output from a target output device with high reproducibility. More specifically, a color to be reproduced can be accurately reproduced in correspondence with an image output device to be used.

Since the color separation values obtained by the above-mentioned processing are data representing values defined by the CMY space, if these data are used as color data for an identical target output device, the target color to be reproduced can always be reproduced.

Assume that an identical design sheet is used, and the same color as that on the sheet is to be output from another color image output device 3c. In this case, the color image output device 3c is connected to the output terminal of the color analysis unit 1, and a setting operation for using the color image output device 3c as an output device is performed at the input section 11.

The control section 15 reads out the parameters 18c as the learning result of the color image output device 3c, and sets them in the neural network of the color separation section 13. Thereafter, the designer or operator colorimetrically measures the design sheet as an object to be measured using the colorimetry device 2.

In the colorimetry device 2, colorimetry values of the target design sheet are output as L*a*b* values, and are supplied to the color separation section 13. The input L*a*b* values are converted into CMY values for the color image output device 3c to be used by the neural network of the color separation section 13, and the converted values are supplied to the control section 15. The control section 15 causes the display section to display the CMY values, and supplies the CMY values to the color image output device 3c. The color image output device 3c prints out a color corresponding to the colorimetric portion of the target design sheet. Thus, the color image output device 3c can output a print having the same color as that of the design sheet, and a target color can be numerically known as CMY values to be used in the color image output device 3c.

Figure 6:
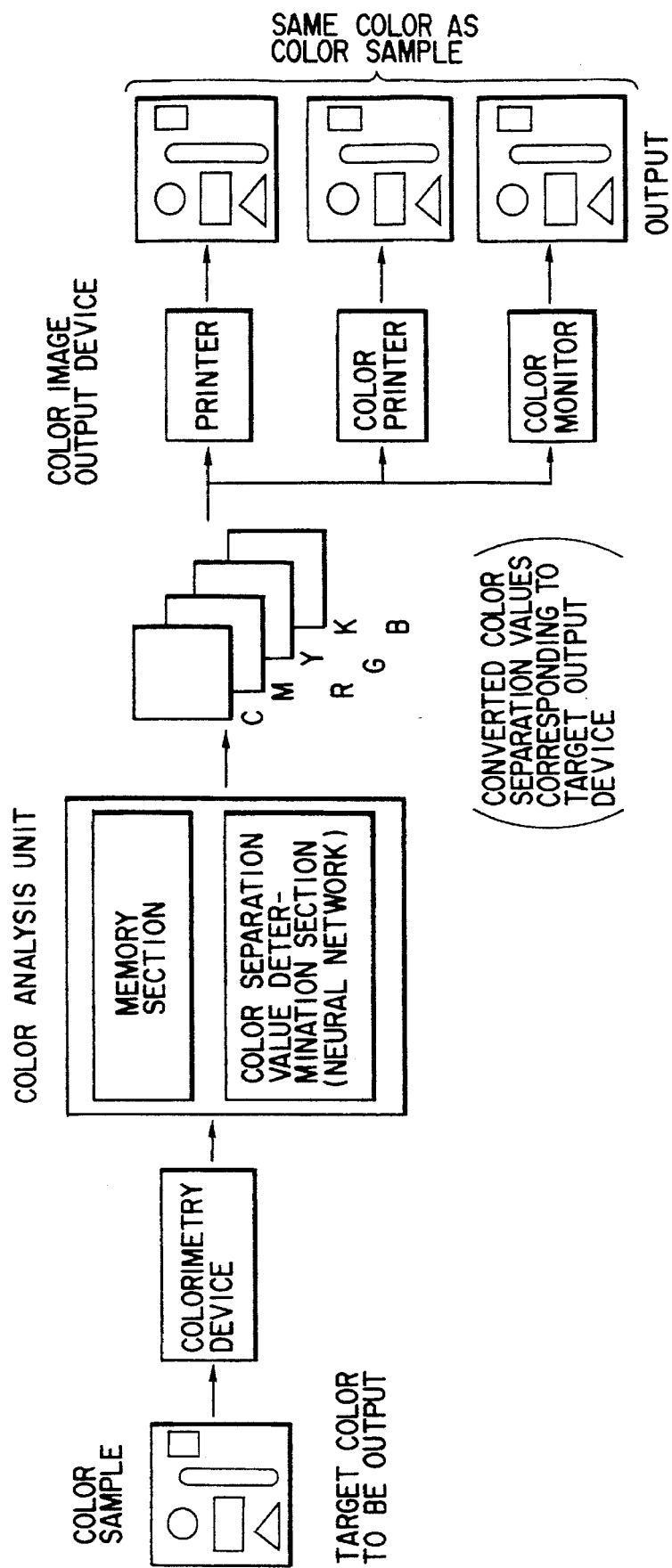
FIG. 6 is a diagram showing the principle of color reproduction processing of the color image reproduction system shown in FIG. 1.

FIG. 6 shows the principle of the above-mentioned processing operation. Regardless of the print/display method or color material used by a color image output device, if the neural network executes the above-mentioned learning processing, the same color as that of a required color sample can be output from any color image output device only by colorimetrically measuring the required color sample created by the designer.

As described above, according to the first embodiment of the present invention, the neural network is used as conversion means for converting colorimetric values into color separation values. When a color image output device which receives color separation value signals and outputs a color image is to be used, a standard color sample having known color separation values is output from the color image output device to be used. The output color sample is colorimetrically measured to obtain the colorimetric values of the color sample, and learning of the neural network is executed to have conversion characteristics for obtaining color separation values corresponding to the color sample. Thereafter, an object to be reproduced having a required color is colorimetrically measured, and colorimetric values obtained by the colorimetry processing are converted into color separation values by the neural network of the conversion means.

The colorimetric values provide information inherent to a color, which does not depend on the characteristics of individual color image output devices, and a color is determined by the colorimetric values. On the other hand, a color image output device such as a color printer is a device for outputting a color in correspondence with input color separation values, and even when the same color separation values are input, a color to be printed/displayed varies depending on the print/display method or the color material to be used of the color image output device. Thus, colorimetric values which have an unchangeable relationship with a color are utilized, and are obtained by colorimetrically measuring a sample of a color to be obtained. From the colorimetric values, color separation values for a color image output device as a target output device are obtained using the neural network which has undergone learning in correspondence with the color image output device as the target output device. Therefore, regardless of the print/display method or color material used by the color image output device as the target output device, a target color can be output from color image output devices of any types only by causing the neural network to learn the relationship between the colorimetric values and the color separation values using the colorimetric values obtained from a standard color sample.

The neural network is a neural circuit for executing digital arithmetic processing. For this reason, since color separation values as converted values of the neural network are obtained as digital data, the color separation values are obtained as numerical value data. Therefore, according to the present invention, a correspondence between a color to be obtained and color separation values (CMY(K) or RGB values) in a color image output device to be used can be detected, and a target color can be easily reproduced by a target color image output device.

A color image reproduction system according to the second embodiment of the present invention will be described below.

FIG. 10 shows the outer appearance of the color image reproduction system according to the second embodiment of the present invention. As shown in FIG. 10, a color image reproduction system 20 comprises color analysis units 1A and 1B, colorimetry devices 2A and 2B, and color image output devices 3A and 3B. The color analysis unit 1A and the colorimetry device 2A, and the color analysis unit 1A and the color image output device 3A are respectively connected to each other via signal transmission lines 4A and 5A, thus constituting a color image reproduction system 10A. Similarly, the color analysis unit 1B and the colorimetry device 2B, and the color analysis unit 1B and the color image output device 3B are respectively connected to each other via signal transmission lines 4B and 5B, thus constituting a color image reproduction system 10B. Furthermore, the color analysis units 1A and 1B are connected to each other via a transmission path 8.

Thus, the color image reproduction system 10A constituted by the color analysis unit 1A, the colorimetry device 2A, and the color image output device 3A, and the color image reproduction system 10B constituted by the color analysis unit 1B, the colorimetry device 2B, and the color image output device 3B are connected to each other via the transmission path 8. The transmission path 8 adopts a communication line such as a LAN (local area network). A relay device having a function of correcting and amplifying a signal to be transmitted may be arranged along the transmission path 8, and the transmission path may be one for connecting two distant systems.

FIG. 11 shows the arrangement of the color image reproduction system 20. In the second embodiment, the color image reproduction systems 10A and 10B have the color analysis units, colorimetry devices, and color image output devices having the same arrangements so as to allow transmission/reception of color image signals and an output operation of images between the two systems. As the color image output devices, for example, a color image output device 3A is connected to the color analysis unit 1A, and color image output devices 3B-1 to 3B-3 of different types are connected to the color analysis unit 1B.

The color analysis units 1A and 1B, the colorimetry devices 2A and 2B, and the color image output devices 3A and 3B-1 to 3B-3 constituting the color image reproduction system 20 have substantially the same functions and arrangements as those of the color analysis unit 1, the colorimetry device 2, and the color output device 3 constituting the color image reproduction system 10 of the above-mentioned first embodiment, except for some functions provided to the color analysis units 1A and 1B. Therefore, in this embodiment, a detailed description of the functions and arrangements will be omitted except for some functions and arrangements of the color analysis units 1A and 1B.

A difference from the color analysis unit 1 of the above-mentioned first embodiment will be described below. The color analysis units 1A and 1B respectively comprise communication sections 19A and 19B, and each of the color analysis units 1A and 1B can transmit or receive various signal to the distant color analysis unit 1B or 1A via the transmission path 8. For example, when an arbitrary sample is colorimetrically measured by the colorimetry device 2A, colorimetric values can be sent from the color analysis unit 1A to the color analysis unit 1B via the transmission path 8. In this case, the color analysis unit 1B converts the received colorimetric values into corresponding color separation values and can output the same color as that of the sample from the color image output devices 3B-1 to 3B-3. The communication sections 19A and 19B are respectively connected to control sections 15A and 15B, and operate under the control of these control sections 15A and 15B. More specifically, each of the control sections 15A and 15B has a function (communication mode) of executing the above-mentioned communication processing. Such processing is executed by designating the communication mode as a command from an input section 11A or 11B.

Each of the communication sections 19A and 19B is capable of converting the format of signals transmitted/received inside the system 10A or 10B and the format of signals transmitted/received via the transmission path 8 to each other. For example, the communication section can convert a parallel signal sent from the control section 15 into a serial signal, and can send the serial signal to the distant system via the transmission path 8. Also, the communication section can convert a serial signal sent from the distant station into a parallel signal, and can send the parallel signal to the control section 15.

In the second embodiment, both the color image reproduction systems 10A and 10B can colorimetrically measure the colors of objects to be reproduced, and can output target colors from the color image output device 3A or the color image output devices 3B-1 to 3B-3 connected to the color analysis units 1A and 1B. In this case, in each of the systems 10A and 10B, color separation values are generated using a standard color sample having known color separation values (CMY values in this embodiment), so that the output color of the color image output device coincides with the color of an object to be reproduced. Upon generation of the color separation values, the systems 10A and 10B must effect learning processing in color separation sections 13A and 13B so as to obtain color separation values which can yield the same color as that of the object to be reproduced, in consideration of the color output characteristics of a color image output device as a target output device.

Figure 3:
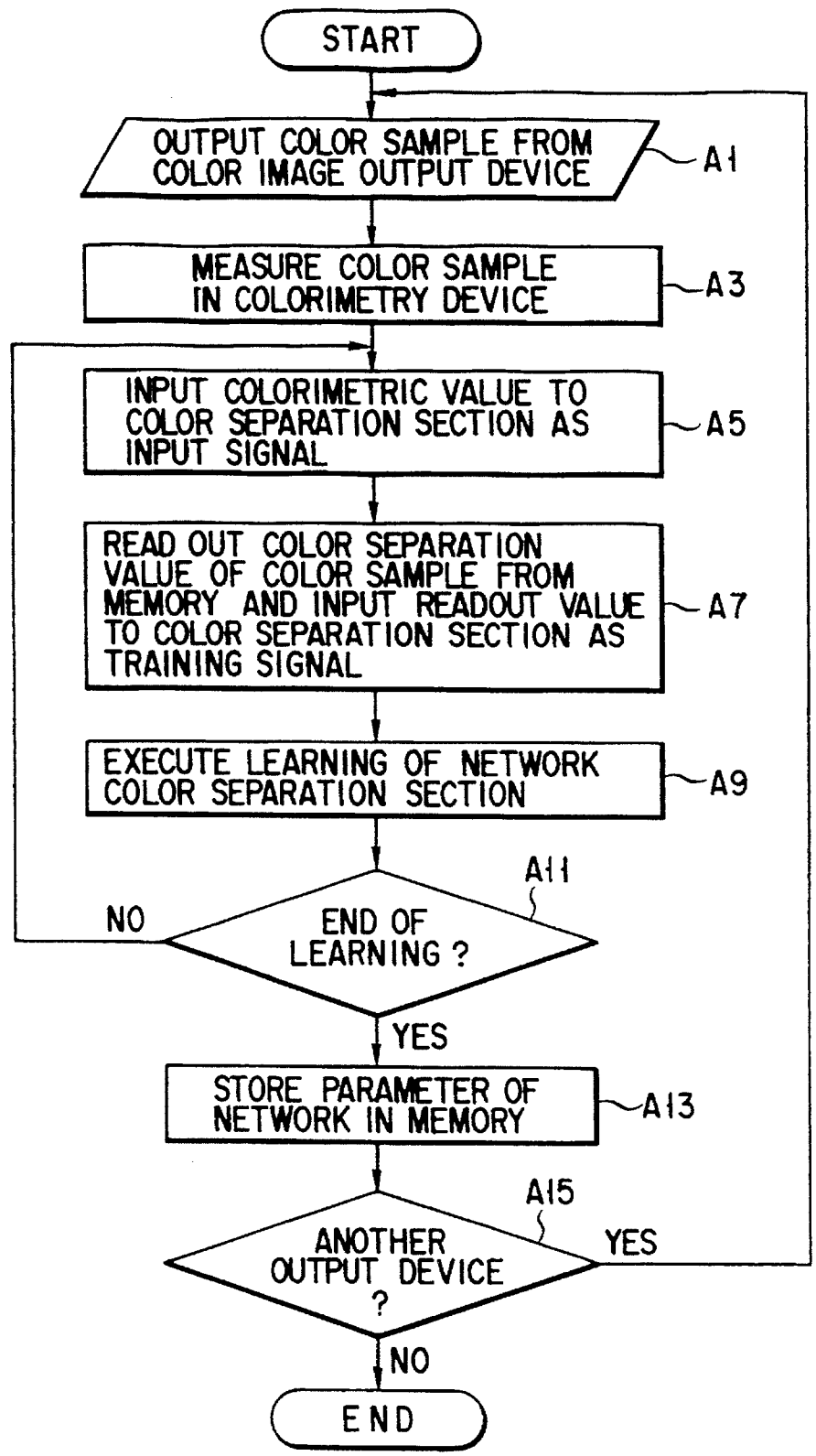
FIG. 3 is a flow chart for explaining the operation of the color image reproduction system shown in FIG. 2.

Since the learning processing in each of the systems 10A and 10B has already been described in the first embodiment with reference to FIGS. 2 and 3, a detailed description thereof will be omitted.

Upon completion of the learning processing of the neural networks, operators or designers can perform color analysis and printing of images using the color image reproduction systems 10A and 10B. Such color image reproduction processing is accomplished by designating a color image output device to be used and setting the control section 15A or 15B in the colorimetry mode using the input section 11A or 11B. Since various operations in the colorimetry mode have already been described in the first embodiment with reference to FIGS. 4 and 5, a detailed description thereof will be omitted.

An operation performed when a target color is to be output from a distant system using the systems which have already finished the learning processing will be described below. In this case, operators and the like connect the communication sections 19A and 19B of their systems to the transmission path 8, and set both the systems at transmitting and receiving points in an image data transmission mode (communication mode) by operating the input sections 11A and 11B. In the following description, a case will be exemplified wherein a design sheet (object to be reproduced) colorimetrically measured by the colorimetry device 2A of the system 10A is printed (color-reproduced) using the color image output device 3B-1 of the system 10B.

First, the control section 15B at the receiving point (system 10B) reads out parameters corresponding to the color image output device 3B-1 to be used from a memory section 14B, supplies them to the color separation section 13B, and sets the neural network of the color separation section 13B on the basis of the parameters (step C1).

At the transmitting point (system 10A), a design sheet to be sent to a distant system, which is designed by a designer, is colorimetrically measured as an object to be measured 6 using the colorimetry device 2A (step D1).

The colorimetry device 2A at the transmitting point obtains colorimetric values of the design sheet as L*a*b* values, and outputs L*a*b* signals. In the communication mode, the control section 15A receives the L*a*b* signals sent from the colorimetry device 2A via a colorimetry device IF 17A, and temporarily stores them in a memory section 14A. Upon completion of colorimetry processing for the design sheet to be reproduced, the control section 15A sends L*a*b* signals corresponding to the stored colorimetry values to the communication section 19A. The communication section 19A converts the L*a*b* signals sent from the control section 15A into signals for transmission, and sends the converted signals to the communication section 19B at the receiving point via the transmission path 8 (step D3).

The communication section 19B at the receiving point receives the signals sent via the transmission path 8, converts the received signals into signals which can be transmitted/received in the system 10B, and sends the converted signals to the control section 15B (step C3). The control section 15B temporarily stores colorimetric values represented by the L*a*b* signals in the memory section 14B. After all the transmitted colorimetric values are stored, the control section 15B sends L*a*b* signals representing these values to the color separation section 13B (step C5). More specifically, the control section 15B inputs L*a*b* values represented by the L*a*b* signals to the input layer of the neural network of the color separation section 13B.

The color separation section 13B of the color analysis unit 1B sequentially converts the input L*a*b* values into color separation values (CMY values) using the neural network (step C7). CMY signals representing the converted CMY values are sent to the color image output device 3B-1 via an output section 16B under the control of the control section 15B. The color image output device 3B-1 prints out colors (color image) corresponding to the sent color separation values (step C9).

A color image signal transmitted from the transmitting point corresponds to colorimetric values obtained by colorimetrically measuring the design sheet, and is an absolute index representing a color. On the other hand, in the system at the receiving point, various parameters of the neural network have already been stored in the memory section 14B upon completion of learning, and the parameters corresponding to the color image output device 3B-1 used for outputting a color image are read out from the memory section 14B and are set in the neural network of the color separation section 13B. Thus, the colorimetric values can be dataconverted, so that a color print output from the color image output device 3B-1 to be used has the same color as that to be expressed by the colorimetric values. More specifically, the dot area ratio or the like can be accurately calculated in accordance with the colorimetric values. Therefore, even between distant places, a color to be transmitted from the transmitting point can be faithfully reproduced at the receiving point.

The neural network is a neural circuit for executing digital arithmetic processing. For this reason, since color separation values as converted values of the neural network are obtained as digital data, the color separation values are obtained as numerical value data. Therefore, according to the present invention, a correspondence between a color to be obtained and color separation values (CMY(K) or RGB values) in a color image output device to be used can be detected, and a target color can be easily reproduced by a target color image output device.

A color image reproduction system according to the third embodiment of the present invention will be described below. FIG. 13 shows the arrangement of the third embodiment. A color image reproduction system 30 includes transmitting and receiving systems which have different usages. In the second embodiment, the transmitting and receiving systems have the same arrangement to allow bidirectional communications of colors. However, when the transmitting and receiving systems can be determined in advance, the arrangement shown in FIG. 13 can be adopted.

In the third embodiment shown in FIG. 13, a transmitting system 10C is constituted by a color analysis unit 1C and a colorimetry device 2C, and colorimetric values obtained by the colorimetry device 2C can be transmitted. For this purpose, the color analysis unit 1C comprises an interactive input section 11C, a display section 12C, a memory section 14C, a control section 15C, a colorimetry device IF 17C, and a communication section 19C. The transmitting system 10C transmits L*a*b* values obtained by the colorimetry device 2C from the communication section 19C to the receiving system via a transmission path 8 under the control of the control section 15C. Since the units constituting the transmitting system 10C have the same functions and arrangements as those in the second embodiment, a detailed description thereof will be omitted.

A receiving system 10D comprises a color analysis unit 1D, a colorimetry device 2D, and color image output devices 3D-1 to 3D-3. The system 10D generates color separation values (CMY values) corresponding to a color image output device to be used on the basis of L*a*b* values sent from the transmitting system 10C, and reproduces the colors (color image) of a design sheet colorimetrically measured by the transmitting system. The color analysis unit 1D has the same arrangement as that of the color analysis unit in the second embodiment, i.e., comprises an interactive input section 11D, a display section 12D, a color separation section 13D, a memory section 14D a control section 15D, an output section 16D, a colorimetry device IF 17D, and a communication section 19D. Since the units constituting the system 10D have the same functions and arrangements as those in the second embodiment, a detailed description thereof will be omitted.

Since the receiving system 10D is the same as that in the second embodiment, this means that the receiving system 10D is capable of teaching the neural network of the color separation section 13D in correspondence with the color image output devices 3D-1 to 3D-3, of converting received colorimetric values into color separation values using the neural network which has finished learning, and of performing a color print operation from the color image output device using the converted color separation values. Operations in the learning processing (learning mode) and in conversion/output processing (colorimetry mode) are the same as those which have already described in the first embodiment with reference to FIGS. 2 to 9, and a detailed description thereof will be omitted.

Figure 12:
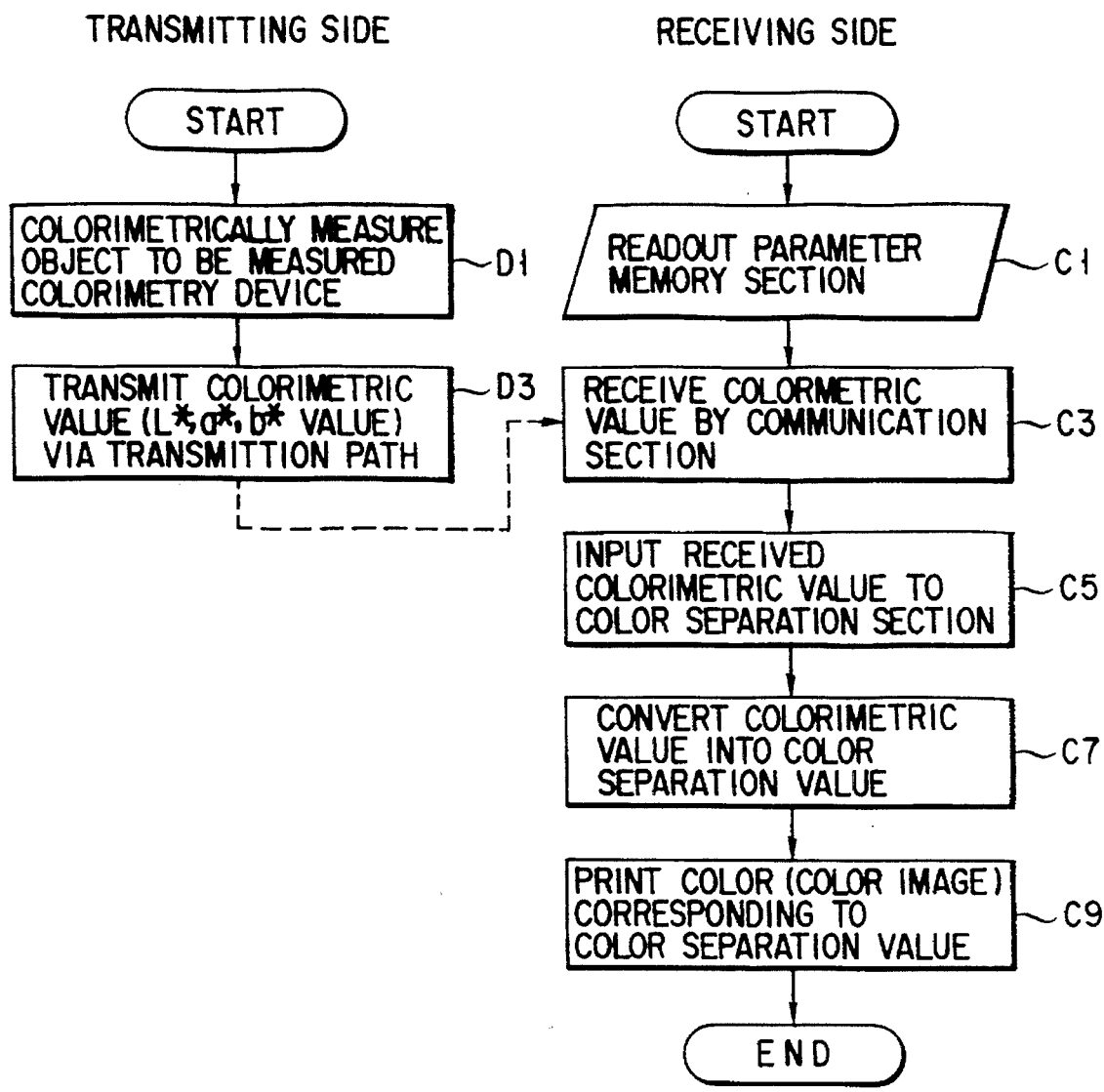
FIG. 12 is a flow chart showing the operation, in a communication mode, of the color image reproduction system shown in FIG. 7.

Furthermore, in the color image reproduction system 30, the colors (color image) of a design sheet colorimetrically measured by the transmitting system 10C can be reproduced by the receiving system 10D. Such processing is effected in a state wherein the transmitting and receiving systems are set in the communication mode. Since the operations in the communication mode are the same as those described in the second embodiment with reference to FIGS. 11 and 12, a detailed description 10 thereof will be omitted.

As described in the third embodiment, when the transmitting and receiving systems are designated in advance, a system for faithfully transmitting a target color to a distant system and reproducing the color while reducing cost of the transmitting system can be realized.

A color image reproduction system according to the fourth embodiment of the present invention will be described below. FIG. 14 shows the arrangement of a color image reproduction system 40 according to the fourth embodiment. The color image reproduction system 40 has substantially the same arrangement as that in the second embodiment, except that system 10F has no colorimetry device 2F. Therefore, learning by a neural network of a color separation section 13F using standard color samples output from color image output devices 3F-1 to 3F-3 connected to an output section 16F of a color analysis unit 1F cannot be performed.

Since the units constituting the color image reproduction system 40 are substantially the same as those described in the second embodiment except for the abovementioned difference, a detailed description thereof will be omitted.

On the other hand, in a system 10E, learning by a neural network of a color separation section 13E using a standard color sample output from a color image output device 3E can be effected. Since the processing operation in the learning processing (learning mode) is the same as that described above in the first embodiment, a detailed description thereof will be omitted. Also, since the processing operation in the colorimetry/output processing (colorimetry mode) accomplished in the system 10E is the same as that of the first embodiment, a detailed description thereof will be omitted.

In the fourth embodiment, a processing operation for reproducing the colors (color image) of a design sheet, which colors are colorimetrically measured by the system 10E (transmitting system), in the system 10F (receiving system) under an assumption that the color image output device 3E shown in FIG. 14 is the same type as that of the color image output device 3F-1 will be described below with reference to the flow chart in FIG. 15. The system 10E has already accomplished learning processing, and parameters 18a corresponding to the color image output device 3E have already been stored in a memory section 14E.

First, operators and the like connect communication sections 19E and 19F of their systems to a transmission path 8, and set both the transmitting and receiving systems in an image data transfer mode (communication mode) by operating input sections 11E and 11F.

In the transmitting system 10E, a design sheet as an object to be transmitted, which is designed by a designer, is colorimetrically measured as an object to be measured 6 using a colorimetry device 2E (step E1). The colorimetry device 2E of the transmitting system obtains colorimetric values of the design sheet as L*a*b* values, and outputs L*a*b* signals. In the communication mode, a control section 15E receives the L*a*b* signals sent from the colorimetry device 2E via a colorimetry device IF 17E, and temporarily stores them in a memory section 14E. Upon completion of the colorimetry processing for the design sheet as the object to be measured, the control section 15E generates color information using the stored colorimetric values and the parameters 18a stored in the memory section 14E (step E3). The color information is sent to the communication section 19E. The communication section 19E converts the color information sent from the control section 15E into a signal for transmission, and transmits the converted signal to the communication section 19F of the receiving system via the transmission path 8 (step E5).

The communication section 19F of the receiving system receives the signal sent via the transmission path 8, converts the received signal into a signal which can be transmitted/received inside the system 10F, and sends the converted signal to a control section 15F (step F1). The control section 15F stores the colorimetric values and the parameters 18a represented by the color information in a memory section 14F. After all the pieces of transmitted color information are stored, the control section 15F sets the neural network of the color separation section 13F on the basis of the parameters 18a (step F3). Upon completion of setting of the neural network, the control section 15F sends L*a*b* signals representing L*a*b* values stored in the memory section 14F to the color separation section 13F (step F5). More specifically, the control section 15F inputs the L*a*b* values represented by the L*a*b* signals to the input layer of the neural network of the color separation section 13F.

The color separation section 13F of the color analysis unit 1F sequentially converts the input L*a*b* values into color separation values (CMY values) (step F7). CMY signals representing the CMY values are sent to the color image output device 3F-1 via the output section 16F under the control of the control section 15F. The color image output device 3F-1 prints out colors (color image) corresponding to the sent color separation values (step F9).

With this arrangement, even when the receiving system cannot accomplish learning processing, if a device which is of the same type as that of a color image output device to be used is connected to the transmitting system, and learning processing can be effected in the transmitting system, a target color (color image) can be printed by the color image output device of the receiving system by effecting the above-mentioned processing in the communication mode.

If the receiving system has already stored the received parameters in the memory section, the transmitting system need only transmit colorimetric values, as has been described in the second embodiment, when a color (color image) is output using the same color image output device again.

In the fourth embodiment, the system 10F has no colorimetry device 2. For example, when the system 10B cannot perform learning processing in the second embodiment, the above-mentioned communication processing can be applied.

In each of the first to fourth embodiments, the CIE L*a*b* color system is applied to color system defining colorimetric values. However, the present invention is not limited to this. For example, the XYZ color system described above, a Yxy color system, L*u*v* color system, HVC Munsell color system and the like may be applied to the color system of the present invention. Yxy values defined in the Yxy color system can be obtained by calculating the XYZ values. L*u*v* values defined in the L*u*v* color system equal to coordinate values of the uniform color space like the L*a*b* values. In HVC Munsell values defined in the HVC Munsell color system, the H represents the hue, the v represents the lightness, and the C represents the saturation. Also, the YMC(K) system is used as color separation values. However, other color separation values such as an RGB system may be used.

In each of the first to fourth embodiments, color printers are used as the color image output devices. However, the present invention can be applied to color output devices which output colors using color separation values. For example, as color output devices, in addition to a printer, a color printer, a color copying machine, a color facsimile device, and the like, a liquid crystal color display, a color CRT display, a projection type color display, and the like may be used as long as colorimetry processing for obtaining colorimetric values can be performed.

As described above, in each of the first to fourth embodiments of the present invention, the neural network is used upon conversion of colorimetric values into color separation values. When a color image output device which receives color separation value signals and outputs a color image is used, the color image output device to be used outputs a standard color sample having known color separation values. The color sample is colorimetrically measured to obtain colorimetric values of the color sample, and the neural network executes learning to have conversion characteristics which can yield color separation values corresponding to the color sample. Thereafter, an object to be reproduced which has a required color is colorimetrically measured, and colorimetric values obtained by the colorimetry processing are converted into color separation values by the neural network of the above-mentioned conversion means.

The colorimetric values provide information inherent to a color, which does not depend on the characteristics of individual color image output devices, and a color is determined by the colorimetric values. On the other hand, a color image output device such as a color printer is a device for outputting a color in correspondence with input color separation values, and even when the same color separation values are input, a color to be printed/displayed varies depending on the print/display method or the color material to be used of the color image output device. Thus, colorimetric values which have an unchangeable relationship with a color are utilized, and are obtained by colorimetrically measuring a sample of a color to be obtained. From the colorimetric values, color separation values for a color image output device as a target output device are obtained using the neural network which has been subjected to learning in correspondence with the color image output device as the target output device. Therefore, regardless of the print/display method or color material used by the color image output device as the target output device, a target color can be output from color image output devices of any types only by causing the neural network to learn the relationship between the colorimetric values and the color separation values using the colorimetric values obtained from a standard color sample.

The neural network is a neural circuit for executing digital arithmetic processing. For this reason, since color separation values as converted values of the neural network are obtained as digital data, the color separation values are obtained as numerical value data. Therefore, according to the present invention, a correspondence between a color to be obtained and color separation values (CMY(K) or RGB values) in a color image output device to be used can be detected, and a target color can be easily reproduced by a target color image output device.

In each of the second to fourth embodiments, in systems arranged at two distant places, the transmitting system transmits colorimetric values, and the receiving system outputs a color corresponding to the received colorimetric values from a color image output device. Upon conversion of colorimetric values into color separation values, the neural network is used as in the first embodiment.

In each of the second and third embodiments, in the receiving system, a standard color sample having known color separation values and output from a color image output device is colorimetrically measured by the colorimetry device to optimize parameters in the neural network. Therefore, color separation values (e.g., the dot area ratio) used when color information based on colorimetric values transmitted via communication means is to be output from a designated color image output device can be accurately and easily calculated, and accurate color transmission can be realized.

Furthermore, in the fourth embodiment, even when learning by the neural network cannot be performed or has not been performed yet in the receiving system connected via the communication means, a target color (color image) can be output. When a color image output device of the same type as that used in the receiving system is connected to the transmitting system, teaching of the neural network is performed in the transmitting system, and parameters obtained by the learning processing are transmitted to the receiving system together with colorimetric values. In the receiving system, learning by the neural network is performed based on the received parameters. Thereafter, color separation values are obtained, and a target color can be accurately output from a color image output device.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color image reproduction system which comprises colorimetry means for generating a colorimetric value signal by colorimetrically measuring a color sample, and image output means for outputting a color image corresponding to a color separation value signal and for outputting a standard color sample in correspondence with predetermined color separation value signals, comprising:

conversion means, constituted by a neural network, for converting the colorimetric value signal generated by said colorimetry means into a color separation value signal in accordance with setting of a parameter;

learning control means for controlling said neural network of said conversion means so that colorimetric value signals of the standard color sample received from said colorimetry means are converted into the predetermined color separation value signals in order to adjust the parameter of said neural network corresponding to said image output means; and image reproduction control means for converting a colorimetric value signal of an object to be reproduced, which signal is generated by said colorimetry means, into a color separation value signal in response to said conversion means, and supplying the converted color separation value signal to said image output means to output a color image of the object to be reproduced, said color image reproduction system comprising a plurality of image output means of different types.

2. A system according to claim 1, wherein the colorimetric value signal is a signal representing L*a*b* values defined in a CIE L*a*b* space.

3. A system according to claim 1, wherein the colorimetric value signal is a signal representing XYZ values defined in an XYZ space.

4. A system according to claim 1, wherein the colorimetric value signal is a signal representing Yxy values defined in a Yxy space.

5. A system according to claim 1, wherein the colorimetric value signal is a signal representing L*u*v* values defined in a L*u*v* space.

6. A system according to claim 1, wherein the colorimetric value signal is a signal representing HVC Munsell values defined in a HVC Munsell space.

7. A system according to claim 1, wherein the color separation value signal is a signal of CMY values representing ratios of cyan (C), magenta (M), and yellow (Y).

8. A system according to claim 1, wherein the color separation value signal is an RGB value signal representing ratios of red (R), green (G), and blue (B).

9. A system according to claim 1, wherein said neural network of said conversion means has a layered structure equal to or more than three-layered, and each layers of said neural network include units equal to or more than three units.

10. A system according to claim 1, wherein each of the parameters includes a type of the image output device, the layer structure of said neural network, the number of units of each layer in the layer structure, and a weight associated with each unit.

11. A color image reproduction system comprising:

colorimetry means for generating a colorimetric value signal by colorimetrically measuring a color sample;

a plurality of image output means of different types, each having a function of outputting a color image corresponding to a color separation value signal and a function of outputting a standard color sample in correspondence with predetermined color separation value signals;

conversion means, constituted by a neural network, for converting the colorimetric value signal generated by said colorimetry means into a color separation value signal in accordance with setting of a parameter;

storage means for storing the parameter and the predetermined color separation value signals;

input means for inputting an instruction of the image output means to be used in color image reproduction processing of said plurality of image output means; and a processor for controlling said color image reproduction system, said processor having a function of executing processing for performing, for each of said plurality of image output means, learning of said neural network of said conversion means so as to convert the colorimetric value signals of the standard color sample which are colorimetrically measured by said colorimetry means into color separation value signals stored in said storage means, and an image reproduction function of reading out the parameter corresponding to the image output means designated by said input means from said storage means, setting the readout parameter in said conversion means, inputting a colorimetric value signal of an object to be reproduced, which signal is generated by said colorimetry means, to said conversion means, and outputting a color separation value signal converted by said conversion means to the image output means designated by said input means to output a color image corresponding to the colorimetric value signal of the object to be reproduced.

12. A system according to claim 11, wherein the colorimetric value signal is a signal representing L*a*b* values defined in a CIE L*a*b* space.

13. A system according to claim 11, wherein the colorimetric value signal is a signal representing XYZ values defined in an XYZ space.

14. A system according to claim 11, wherein the colorimetric value signal is a signal representing Yxy values defined in a Yxy space.

15. A system according to claim 11, wherein the colorimetric value signal is a signal representing L*u*v* values defined in a L*u*v* space.

16. A system according to claim 11, wherein the colorimetric value signal is a signal representing HVC Munsell values defined in a HVC Munsell space.

17. A system according to claim 11, wherein the color separation value signal is a signal of CMY values representing ratios of cyan (C), magenta (M), and yellow (Y).

18. A system according to claim 11, wherein the color separation value signal is an RGB value signal representing ratios of red (R), green (G), and blue (B).

19. A color image reproduction system comprising:

a transmission path for connecting a plurality of units;

a first unit comprising first colorimetry means for generating a colorimetric value signal by colorimetrically measuring a color sample, and transmission means for transmitting the colorimetric value signal generated by said first colorimetry means via said transmission path; and a second unit comprising second colorimetry means for generating a colorimetric value signal by colorimetrically measuring a color sample, image output means having a function of outputting a color image corresponding to a color separation value signal and a function of outputting a standard color sample in correspondence with predetermined color separation value signals, first conversion means, constituted by a neural network, for converting the colorimetric value signals generated by said first and second colorimetry means into color separation value signals in accordance with setting of a parameter, storage means for storing the parameter and data represented by the predetermined color separation value signals, learning control means for generating the parameter and storing the generated parameter in said storage means by executing learning of said neural network of said first conversion means, so that colorimetric value signals of the standard color sample, which signals are generated by said second colorimetry means, are converted into the color separation value signals of the data stored in said storage means, and output means for setting the parameter in said conversion means, converting a colorimetric value signal of an object to be reproduced, which signal is sent from said first unit via said transmission path, into a color separation value signal using said conversion means, and supplying the converted color separation value signal to said image output means to output a color image corresponding to the colorimetric value signal of the object to be reproduced.

20. A system according to claim 19, wherein said second unit comprises means for transmitting a colorimetric value signal of a second object to be reproduced, which signal is generated by said second colorimetry means, to said first unit via said transmission path, and said first unit comprises second image output means having a function of outputting a color image corresponding to a color separation value signal and a function of outputting a standard color sample in correspondence with predetermined color separation value signals, second conversion means, constituted by a neural network, for converting the colorimetric value signals generated by said first and second colorimetry means into color separation value signals in accordance with setting of a parameter, second storage means for storing the parameter and data represented by the predetermined color separation value signals, second learning control means for generating the parameter and storing the generated parameter in said second storage means by executing learning of said neural network of said second conversion means, so that colorimetric value signals of the standard color sample, which signals are generated by said first colorimetry means, are converted into the color separation value signals of the data stored in said second storage means, and second output means for setting the parameter stored in said second storage means in said second conversion means, converting a colorimetric value signal of the second object to be reproduced, which signal is sent from said second unit via said transmission path, into a color separation value signal using said second conversion means, and supplying the converted color separation value signal to said second image output means to output a color image corresponding to the colorimetric value signal of the second object to be reproduced.

21. A color image reproduction system comprising:

a transmission path for connecting a plurality of units;

a first unit comprising colorimetry means for generating a colorimetric value signal by colorimetrically measuring a color sample, first image output means having a function of outputting a color image corresponding to a color separation value signal and a function of outputting a standard color sample in correspondence with predetermined color separation value signals, first conversion means, constituted by a neural network, for converting the colorimetric value signal generated by said colorimetry means into a color separation value signal in accordance with setting of a parameter, storage means for storing the parameter and data represented by the predetermined color separation value signals, learning control means for generating the parameter and storing the generated parameter in said storage means by executing learning of said neural network of said first conversion means, so that colorimetric value signals of the standard color sample, which signals are generated by said colorimetry means, are converted into the color separation value signals of the data stored in said storage means, and transmission means for generating color information on the basis of a colorimetric value signal of an object to be reproduced, which signal is generated by said colorimetry means, and the parameter stored in said storage means, and transmitting the color information onto said transmission path; and a second unit comprising second image output means which outputs a color image in correspondence with a color separation value signal and is of the same type as said first image output means, second conversion means, constituted by a neural network, for converting a colorimetric value signal into a color separation value signal in accordance with setting of a parameter, and output means for setting the parameter included in the color information sent from said first unit in said second conversion means, converting a colorimetric value signal of an object to be reproduced, which signal is included in the color information, into a color separation value signal using said second conversion means, and supplying the converted color separation value signal to said second image output means to output a color image corresponding to the colorimetric value signal of the object to be reproduced.

* * * * *